United States Patent
Frisco

(10) Patent No.: US 11,775,728 B2
(45) Date of Patent: Oct. 3, 2023

(54) METHODS FOR SAMPLE SCHEME GENERATION AND OPTIMIZATION

(71) Applicant: ASML NETHERLANDS B.V., Veldhoven (NL)

(72) Inventor: Pierluigi Frisco, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 17/311,846

(22) PCT Filed: Dec. 12, 2019

(86) PCT No.: PCT/EP2019/084776
§ 371 (c)(1),
(2) Date: Jun. 8, 2021

(87) PCT Pub. No.: WO2020/126774
PCT Pub. Date: Jun. 25, 2020

(65) Prior Publication Data
US 2022/0057716 A1     Feb. 24, 2022

(30) Foreign Application Priority Data

Dec. 19, 2018 (EP) .................................... 18214088
Jan. 15, 2019 (EP) .................................... 19151797
Dec. 11, 2019 (EP) .................................... 19215179

(51) Int. Cl.
*G06F 30/30*     (2020.01)
*G03F 7/00*      (2006.01)
(Continued)

(52) U.S. Cl.
CPC ............ *G06F 30/398* (2020.01); *G03F 7/705* (2013.01); *G03F 7/70633* (2013.01); *G06F 2111/06* (2020.01); *G06F 2119/18* (2020.01)

(58) Field of Classification Search
None
See application file for complete search history.

(56) References Cited

U.S. PATENT DOCUMENTS 9,606,453 B2 *   3/2017   Izikson ............... G03F 7/70616
10,832,396 B2 *  11/2020  Duffy .................... G01R 31/308
(Continued)

FOREIGN PATENT DOCUMENTS

EP     3279735     2/2018
EP     3312693     4/2018
(Continued)

OTHER PUBLICATIONS

International Search Report issued in corresponding PCT Patent Application No. PCT/EP2019/084776, dated Mar. 25, 2020.
(Continued)

*Primary Examiner* — Leigh M Garbowski
(74) *Attorney, Agent, or Firm* — Pillsbury Winthrop Shaw Pittman, LLP

(57) ABSTRACT

A method for sample scheme generation includes obtaining measurement data associated with a set of locations; analyzing the measurement data to determine statistically different groups of the locations; and configuring a sample scheme generation algorithm based on the statistically different groups. A method includes obtaining a constraint and/or a plurality of key performance indicators associated with a sample scheme across one or more substrates; and using the constraint and/or plurality of key performance indicators in a sample scheme generation algorithm including a multi-objective genetic algorithm. The locations may define one or more regions spanning a plurality of fields across one or more substrates and the analyzing the measurement data may include stacking across the spanned plurality of fields using different respective sub-sampling.

21 Claims, 11 Drawing Sheets

(51) Int. Cl.
   *G06F 30/398*   (2020.01)
   *G06F 111/06*   (2020.01)
   *G06F 119/18*   (2020.01)

(56) References Cited

U.S. PATENT DOCUMENTS

| | | | |
|---|---|---|---|
| 10,845,713 B2* | 11/2020 | Theeuwes | G01N 21/956 |
| 11,294,289 B2* | 4/2022 | Frisco | G03F 9/7046 |
| 2012/0084041 A1 | 4/2012 | Izikson et al. | |
| 2020/0050180 A1* | 2/2020 | Kou | G05B 19/41875 |

FOREIGN PATENT DOCUMENTS

| | | |
|---|---|---|
| TW | 200737297 | 10/2007 |
| WO | 2018069015 | 4/2018 |

OTHER PUBLICATIONS

Taiwanese Office Action issued in corresponding Taiwanese Patent Application No. 108146342, dated Oct. 15, 2020
Office Action issued in corresponding Korean Patent Application No. 10-2021-7018727, dated Mar. 20, 2023.

\* cited by examiner

METHODS FOR SAMPLE SCHEME GENERATION AND OPTIMIZATION

CROSS-REFERENCE TO RELATED APPLICATIONS

This application is the U.S. national phase entry of PCT Patent Application No. PCT/EP2019/084776 which was filed on Dec. 12, 2019, which claims the benefit of priority of European Patent Application No. 18214088.9 which was filed on Dec. 19, 2018, European Patent Application No. 19151797.8 which was filed on Jan. 15, 2019, and European Patent Application No. 19215179.3 which was filed on Dec. 11, 2019, each of which is incorporated herein in its entirety by reference.

FIELD

The present invention relates to sample scheme generation and optimization, and associated computer programs, lithographic and inspection apparatuses.

BACKGROUND

A lithographic apparatus is a machine applying a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. comprising part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the substrate parallel or anti parallel to this direction. It is also possible to transfer the pattern from the patterning device to the substrate by imprinting the pattern onto the substrate.

Whichever type of apparatus is employed, the accurate placement of patterns on the substrate is a chief challenge for reducing the size of circuit components and other products that may be produced by lithography. In particular, the challenge of measuring accurately the features on a substrate which have already been laid down is a critical step in being able to position successive layers of features in superposition accurately enough to produce working devices with a high yield. So-called overlay should, in general, be achieved within a few tens of nanometers in today's sub-micron semiconductor devices, down to a few nanometers in the most critical layers.

The calibration and qualification of performance of a lithographic apparatus (such as a scanner) is performed with several tests involving exposure and measurement of marks on wafers. This measurement of marks is referred to as mark readout. The set of marks that are readout in a sampling scheme is referred to as a mark readout layout.

Exposure takes place under specific test conditions. Specific reticles are patterned with marks relevant for the test. Exposure using the reticle is performed under specific exposure settings, e.g. illumination, dose, chuck order, number of layers, etc. Once the wafers are exposed and developed, mark readout is performed, e.g. the printed alignment, focus or overlay marks are measured. The mark readout can be performed by the scanner or other devices, such as an inspection apparatus (e.g. an angularly-resolved scatterometer).

The readout values are typically used in calibration and/or qualification of the lithographic apparatus (scanner). In both cases tests return key performance indicators (KPIs), which are values indicating how the test went. Often several KPIs are returned by each test.

These tests are performed both when scanners are made (e.g. in the scanner manufacturing factory during the set-up sequence), during recoveries (e.g. at semiconductor manufacturers, when parts of the scanner are swapped) and during production to test scanner for drifts.

In the conventional approach, all marks exposed in tests are readout from test wafers, thus there is a full mark readout layout. Known methods aiming to reduce mark readout are limited in their performance, because they reduce the accuracy of the calculated KPIs.

SUMMARY

It is desirable to have a general (i.e. applicable to all tests where marks are read out) method that reduces the number read out marks without compromising the test performance and that would allow shorter set-up, recovery and drift calibration/verification times.

According to a first aspect of the present invention, there is provided a method comprising:
  obtaining measurement data associated with a set of locations;
  analyzing the measurement data to determine statistically different groups of the locations; and
  configuring a sample scheme generation algorithm based on the statistically different groups.

According to a second aspect of the present invention, there is provided a method comprising:
  obtaining a constraint and/or a plurality of key performance indicators associated with a sample scheme across one or more substrates; and
  using the constraint and/or the plurality of key performance indicators in a sample scheme generation algorithm comprising a multi-objective genetic algorithm.

According to a third aspect of the present invention, there is provided a method comprising:
  obtaining measurement data associated with a set of locations across one or more substrates;
  analyzing the measurement data; and
  optimizing a sample scheme based on the analysis,
wherein the locations define one or more region spanning a plurality of fields across one or more substrates, the plurality of fields having different respective sub-sampling in the sampling scheme; and
wherein the step of analyzing the measurement data comprises stacking the measurement data across the spanned plurality of fields using their different respective sub-sampling.

According to a fourth aspect of the present invention, there is provided a lithographic apparatus specifically adapted to carry out the steps of the method of the first aspect.

According to a fifth aspect of the present invention, there is provided an inspection apparatus specifically adapted to carry out the steps of the method of the first aspect.

According to a sixth aspect of the present invention, there is provided a computer program comprising computer readable instructions which, when run on suitable computer apparatus, cause the computer apparatus to perform the method of the first aspect.

According to a seventh aspect of the present invention, there is provided a computer program product comprising the computer program of the sixth aspect.

According to an eighth aspect of the present invention, there is provided a lithographic apparatus specifically adapted to carry out the steps of the method of the second aspect.

According to a ninth aspect of the present invention, there is provided an inspection apparatus specifically adapted to carry out the steps of the method of the second aspect.

According to a tenth aspect of the present invention, there is provided a computer program comprising computer readable instructions which, when run on suitable computer apparatus, cause the computer apparatus to perform the method of the second aspect.

According to an eleventh aspect of the present invention, there is provided a computer program product comprising the computer program of the tenth aspect.

According to a twelfth aspect of the present invention, there is provided a lithographic apparatus specifically adapted to carry out the steps of the method of the third aspect.

According to a thirteenth aspect of the present invention, there is provided an inspection apparatus specifically adapted to carry out the steps of the method of the third aspect.

According to a fourteenth aspect of the present invention, there is provided a computer program comprising computer readable instructions which, when run on suitable computer apparatus, cause the computer apparatus to perform the method of the third aspect.

According to a fifteenth aspect of the present invention, there is provided a computer program product comprising the computer program of the fourteenth aspect.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
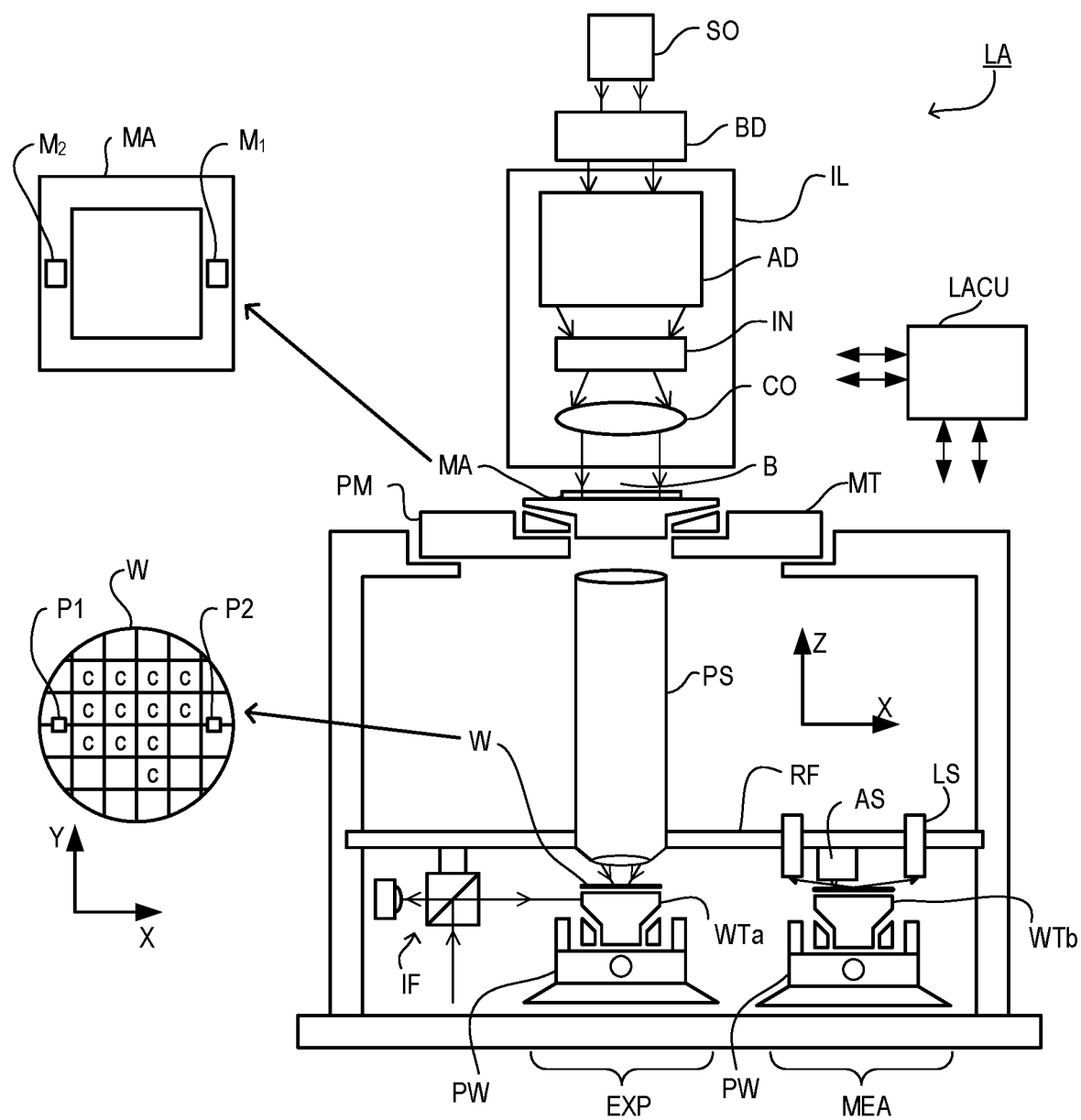
FIG. 1 depicts schematically a lithographic apparatus.

FIG. 1 depicts schematically a lithographic apparatus LA in which embodiments may be implemented. The apparatus comprises:
i. an illumination system (illuminator) IL configured to condition a radiation beam B (e.g. UV radiation or EUV radiation).
ii. a support structure (e.g. a mask table) MT constructed to support a patterning device (e.g. a mask) MA and connected to a first positioner PM configured to accurately position the patterning device in accordance with certain parameters;
iii. a substrate table (e.g. a wafer table) WTa or WTb constructed to hold a substrate (e.g. a resist coated wafer) W and connected to a second positioner PW configured to accurately position the substrate in accordance with certain parameters; and
iv. a projection system (e.g. a refractive projection lens system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure supports, i.e. bears the weight of, the patterning device. It holds the patterning device in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system. Any use of the terms "reticle" or "mask" herein may be considered synonymous with the more general term "patterning device."

The term "patterning device" used herein should be broadly interpreted as referring to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so called assist features. Generally, the pattern imparted to the radiation beam will correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system".

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure. The invention disclosed herein can be used in a stand-alone fashion, but in particular it can provide additional functions in the pre-exposure measurement stage of either single- or multi-stage apparatuses.

The lithographic apparatus may also be of a type wherein at least a portion of the substrate may be covered by a liquid having a relatively high refractive index, e.g. water, so as to fill a space between the projection system and the substrate. An immersion liquid may also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

Referring to FIG. 1, the illuminator IL receives a radiation beam from a radiation source SO. The source and the lithographic apparatus may be separate entities, for example when the source is an excimer laser. In such cases, the source is not considered to form part of the lithographic apparatus and the radiation beam is passed from the source SO to the illuminator IL with the aid of a beam delivery system BD comprising, for example, suitable directing mirrors and/or a beam expander. In other cases the source may be an integral part of the lithographic apparatus, for example when the source is a mercury lamp. The source SO and the illuminator IL, together with the beam delivery system BD if required, may be referred to as a radiation system.

The illuminator IL may comprise an adjuster AD for adjusting the angular intensity distribution of the radiation beam. Generally, at least the outer and/or inner radial extent (commonly referred to as □-outer and □-inner, respectively) of the intensity distribution in a pupil plane of the illuminator can be adjusted. In addition, the illuminator IL may comprise various other components, such as an integrator IN and a condenser CO. The illuminator may be used to condition the radiation beam, to have a desired uniformity and intensity distribution in its cross section.

The radiation beam B is incident on the patterning device (e.g., mask MA), which is held on the support structure (e.g., mask table MT), and is patterned by the patterning device. Having traversed the mask MA, the radiation beam B passes through the projection system PS, which focuses the beam onto a target portion C of the substrate W. With the aid of the second positioner PW and position sensor IF (e.g. an interferometric device, linear encoder or capacitive sensor), the substrate table WTa/WTb can be moved accurately, e.g. so as to position different target portions C in the path of the radiation beam B. Similarly, the first positioner PM and another position sensor (which is not explicitly depicted in FIG. 1) can be used to accurately position the mask MA with respect to the path of the radiation beam B, e.g. after mechanical retrieval from a mask library, or during a scan. In general, movement of the mask table MT may be realized with the aid of a long-stroke module (coarse positioning) and a short-stroke module (fine positioning), which form part of the first positioner PM. Similarly, movement of the substrate table WTa/WTb may be realized using a long-stroke module and a short-stroke module, which form part of the second positioner PW. In the case of a stepper (as opposed to a scanner) the mask table MT may be connected to a short-stroke actuator only, or may be fixed. Mask MA and substrate W may be aligned using mask alignment marks M1, M2 and substrate alignment marks P1, P2. Although the substrate alignment marks as illustrated occupy dedicated target portions, they may be located in spaces between target portions (these are known as scribe-lane alignment marks). Similarly, in situations in which more than one die is provided on the mask MA, the mask alignment marks may be located between the dies.

The depicted apparatus could be used in at least one of the following modes:

1. In step mode, the mask table MT and the substrate table WTa/WTb are kept essentially stationary, while an entire pattern imparted to the radiation beam is projected onto a target portion C at one time (i.e. a single static exposure). The substrate table WTa/WTb is then shifted in the X and/or Y direction so that a different target portion C can be exposed. In step mode, the maximum size of the exposure field limits the size of the target portion C imaged in a single static exposure.

2. In scan mode, the mask table MT and the substrate table WTa/WTb are scanned synchronously while a pattern imparted to the radiation beam is projected onto a target portion C (i.e. a single dynamic exposure). The velocity and direction of the substrate table WTa/WTb relative to the mask table MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the mask table MT is kept essentially stationary holding a programmable patterning device, and the substrate table WTa/WTb is moved or scanned while a pattern imparted to the radiation beam is projected onto a target portion C. In this mode, generally a pulsed radiation source is employed and the programmable patterning device is updated as required after each movement of the substrate table WTa/WTb or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Lithographic apparatus LA in this example is of a so-called dual stage type which has two substrate tables WTa and WTb and two stations—an exposure station and a measurement station-between which the substrate tables can be exchanged. While one substrate on one substrate table is being exposed at the exposure station EXP, another substrate can be loaded onto the other substrate table at the measurement station MEA so that various preparatory steps may be carried out. The preparatory steps may include mapping the surface of the substrate using a level sensor LS and measuring the position of alignment mark on the substrate using an alignment sensor AS. This enables a substantial increase in the throughput of the apparatus. If the position sensor IF is not capable of measuring the position of the substrate table while it is at the measurement station as well as at the exposure station, a second position sensor may be provided to enable the positions of the substrate table to be tracked at both stations. The invention can be applied in apparatus with only one substrate table, or with more than two.

The apparatus further includes a lithographic apparatus control unit LACU which controls all the movements and measurements of the various actuators and sensors described. LACU also includes signal processing and data processing capacity to implement desired calculations relevant to the operation of the apparatus. In practice, control unit LACU will be realized as a system of many sub-units, each handling the real-time data acquisition, processing and control of a subsystem or component within the apparatus. For example, one processing subsystem may be dedicated to servo control of the substrate positioner PW. Separate units may even handle coarse and fine actuators, or different axes. Another unit might be dedicated to the readout of the position sensor IF. Overall control of the apparatus may be controlled by a central processing unit, communicating with these sub-systems processing units, with operators and with other apparatuses involved in the lithographic manufacturing process.

Figure 2:
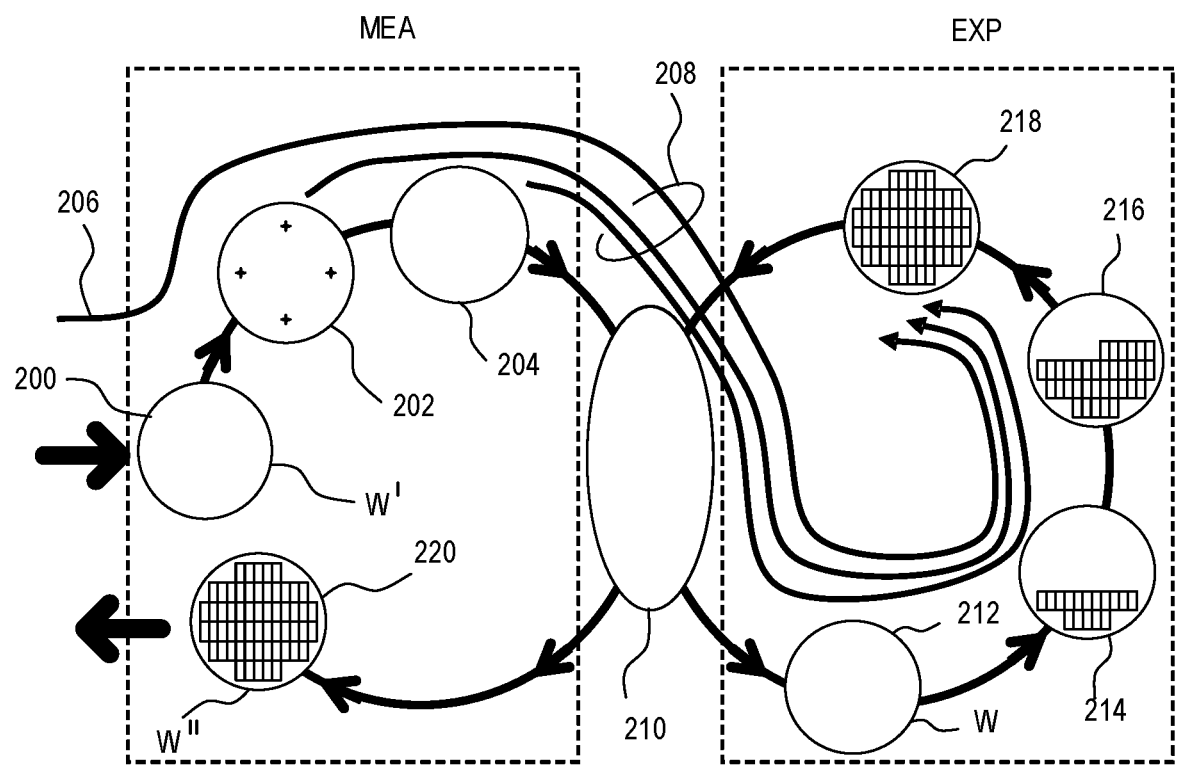
FIG. 2 depicts schematically the stages in the measurement and exposure processes in the apparatus of FIG. 1.

FIG. 2 illustrates the known steps to expose target portions (e.g. dies) on a substrate W in the dual stage apparatus of FIG. 1. On the left hand side within a dotted box are steps performed at a measurement station MEA, while the right hand side shows steps performed at the exposure station EXP. From time to time, one of the substrate tables WTa, WTb will be at the exposure station, while the other is at the measurement station, as described above. For the purposes of this description, it is assumed that a substrate W has already been loaded into the exposure station. At step 200, a new substrate W' is loaded to the apparatus by a mechanism not shown. These two substrates are processed in parallel in order to increase the throughput of the lithographic apparatus. Referring initially to the newly-loaded substrate W', this may be a previously unprocessed substrate, prepared with a new photo resist for first time exposure in the apparatus. In general, however, the lithography process described will be merely one step in a series of exposure and processing steps, so that substrate W' has been through this apparatus and/or other lithography apparatuses, several times already, and may have subsequent processes to undergo as well.

The previous and/or subsequent processes may be performed in other lithography apparatuses, as just mentioned, and may even be performed in different types of lithography apparatus. For example, some layers in the device manufacturing process which are very demanding in parameters such as resolution and overlay may be performed in a more advanced lithography tool than other layers that are less demanding. Therefore some layers may be exposed in an immersion type lithography tool, while others are exposed in a 'dry' tool. Some layers may be exposed in a tool working at DUV wavelengths, while others are exposed using EUV wavelength radiation.

In FIG. 2, at 202, alignment measurements using the substrate marks P1 etc. and image sensors (not shown) are used to measure and record alignment of the substrate relative to substrate table WTa/WTb. In addition, several alignment marks across the substrate W' will be measured, to establish a "wafer grid", which maps very accurately the distribution of marks across the substrate, including any distortion relative to a nominal rectangular grid. At step 204, a map of substrate height against X-Y position is measured also, for use in accurate focusing of the exposed pattern.

When substrate W' was loaded, recipe data 206 were received, defining the exposures to be performed, and also properties of the substrate and the patterns previously made and to be made upon it. To these recipe data are added the measurements of substrate position, substrate grid and height map that were made at 202, 204, so that a complete set of recipe and measurement data 208 can be passed to the exposure stage. The measurements of alignment data for example comprise X and Y positions of alignment targets formed in a fixed or nominally fixed relationship to the product patterns that are the product of the lithographic process. These alignment data, taken just before exposure, are combined and interpolated to provide parameters of an alignment model. These parameters and the alignment model will be used during the exposure operation to correct positions of patterns applied in the current lithographic step. A conventional alignment model might comprise four, five or six parameters, together defining translation, rotation and scaling of the 'ideal' grid, in different dimensions. As described further below, advanced models are known that use more parameters.

At 210, substrates W' and W are swapped, so that the measured substrate W' becomes the substrate W entering the exposure station EXP. This swapping is performed by exchanging the supports WTa and WTb within the apparatus, so that the substrates W, W' remain accurately clamped and positioned on those supports, to preserve relative alignment between the substrate tables and substrates themselves. Accordingly, once the tables have been swapped, determining the relative position between projection system PS and substrate table WTb (formerly WTa) is all that is necessary to make use of the measurement information 202, 204 for the substrate W (formerly W') in control of the exposure steps. At step 212, reticle alignment is performed using the mask alignment marks M1, M2. In steps 214, 216, 218, scanning motions and radiation pulses are applied at successive target locations across the substrate W, in order to complete the exposure of a number of patterns. By using the alignment data and height map obtained at the measuring station in the performance of the exposure steps, these patterns are accurately aligned with respect to the desired locations, and, in particular, with respect to features previously laid down on the same substrate. The exposed substrate, now labeled W" is unloaded from the apparatus at step 220, to undergo etching or other processes, in accordance with the exposed pattern.

Figure 3:
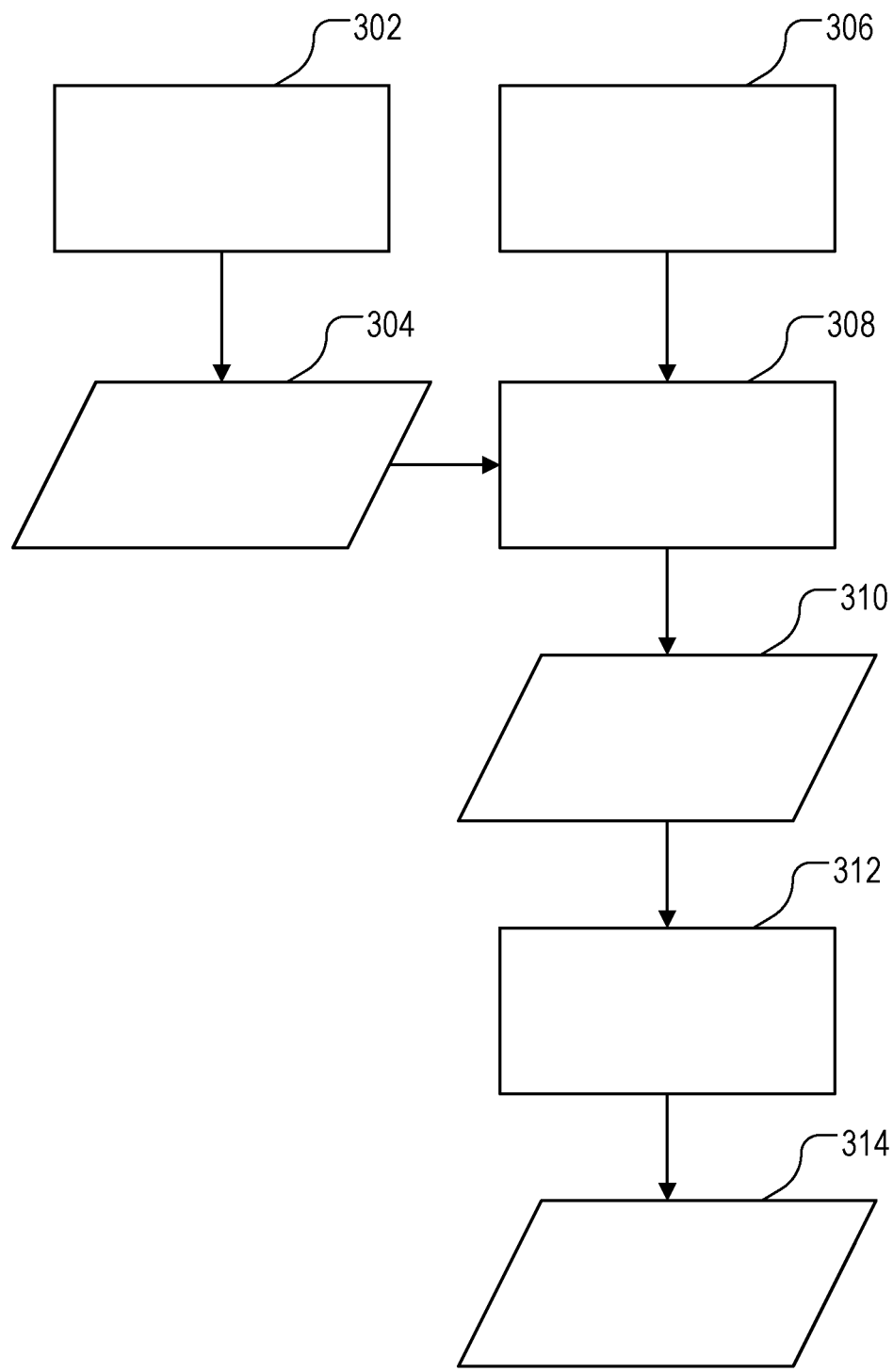
FIG. 3 is a flowchart of the sample scheme generation through to calibration or qualification of a lithographic apparatus.

FIG. 3 is a flowchart of the sample scheme generation through to calibration or qualification of a lithographic apparatus.

A sample scheme generation step 302 generates a sample scheme, in this case a mark readout layout 304. For calibration or qualification of a lithographic apparatus a wafer or series of wafers are exposed and developed 306. The mark readout layout 304 is used in measurements of marks on the wafers at mark readout step 308. The measurements produce readout values 310 which are used for calibration or qualification 312 to produce calculated key performance indicators (KPIs) 314.

In embodiments, the sample scheme generation step 302 may be treated a multi-objective optimization problem, that is solved with a metaheuristic optimization algorithm. One objective is the number of marks to be read out (which needs to be reduced) the other objective is the KPI degradation (which should be as small as possible, i.e., also be reduced).

A metaheuristic is a high-level procedure or heuristic designed to find, generate, or select a heuristic (partial search algorithm) that may provide a sufficiently good solution to an optimization problem, especially with incomplete or imperfect information or limited computation capacity.

An evolutionary algorithm (EA) is a generic population-based metaheuristic optimization algorithm.

A genetic algorithm (GA) is a type of EA. In a GA, a population of candidate solutions (called individuals, creatures, or phenotypes) to an optimization problem is evolved toward better solutions. Each candidate solution has a set of properties (its chromosomes or genotype), represented by a coordinate in the solution domain, which can be mutated and altered. Solutions may be represented in binary as strings of 0s and 1s, but other encodings are also possible.

Simulated annealing (SA) is a probabilistic technique for approximating the global optimum of a given function. SA is a metaheuristic to approximate global optimization in a large search space or solution domain.

Tabu search is another metaheuristic search method employing local search methods used for mathematical optimization.

Genetic algorithms maintain a pool of solutions rather than just one. New candidate solutions are generated not only by "mutation" (as in SA), but also by "recombination" of two solutions from the pool. Probabilistic criteria, similar to those used in SA, are used to select the candidates for duplication, mutation or combination (by cross-over), and for discarding excess solutions from the pool.

In mathematical optimization, a cost function or loss function is a function that maps an event or values of one or more variables onto a real number intuitively representing some "cost" associated with the event. An optimization problem seeks to minimize a cost function. An objective function may be either a cost function or its negative (sometimes called a merit function, reward function, a profit function, a utility function, a fitness function, etc.), in which case it is to be maximized.

A constraint is a condition of an optimization problem that the solution must satisfy.

Embodiments involve performing statistical analysis on test data (such as at step 610 in FIG. 6) to understand sources of variation.

Given the readout data from previous tests of all marks (such as step 606 in FIG. 6), the marks in test wafers can be grouped in different ways. For instance, one can group marks according to: marks which are in scan up (or scan down) fields, marks which are in different quadrants (or any other wafer partition relevant for the test), marks which are in different wafers, marks which are in different field column/row/location, . . . and combination of these groupings. For each of these grouping one can plot the distributions (or the fit to a given distribution, like the Gaussian distribution) of the marks in each group to determine statistically different groups. Examples of statistical differences are:

The marks in a grouping have different means of their associated readout values;

The marks in a grouping have different std (standard deviations) of their associated readout values; and No grouping shows statistical differences in their associated readout values.

For instance, it may be determined that marks in different columns have different means, or that marks at the edge of the wafer have higher variance than the marks in the rest of the wafer. These examples are illustrated by FIGS. 4 and 5.

Figure 4:
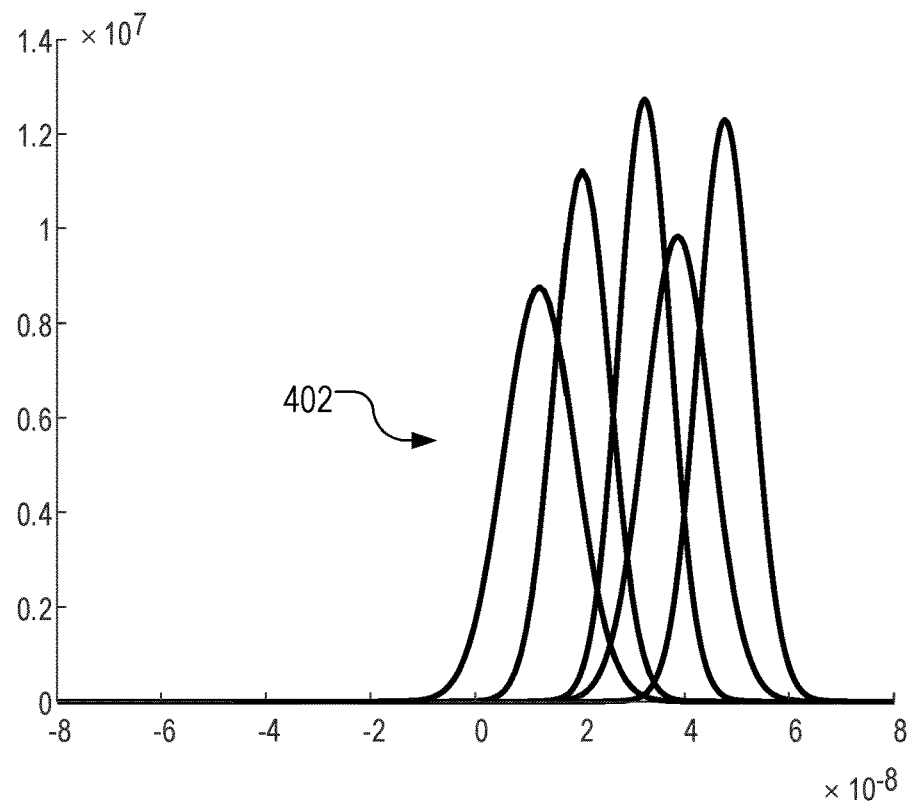
FIG. 4 depicts fits to gaussian distributions of measurements for five different groups of marks across a field.

FIG. 4 illustrates a fit to a Gaussian distribution of measurements for five different groups of marks across a field. Each group is a different column in an exposure field. The probability density in arbitrary units (vertical axis) is plotted 402 against mark readout value in arbitrary units (horizontal axis). Different columns have different means, as shown by the horizontal offset of the five curves, each corresponding to a column group.

Figure 5:
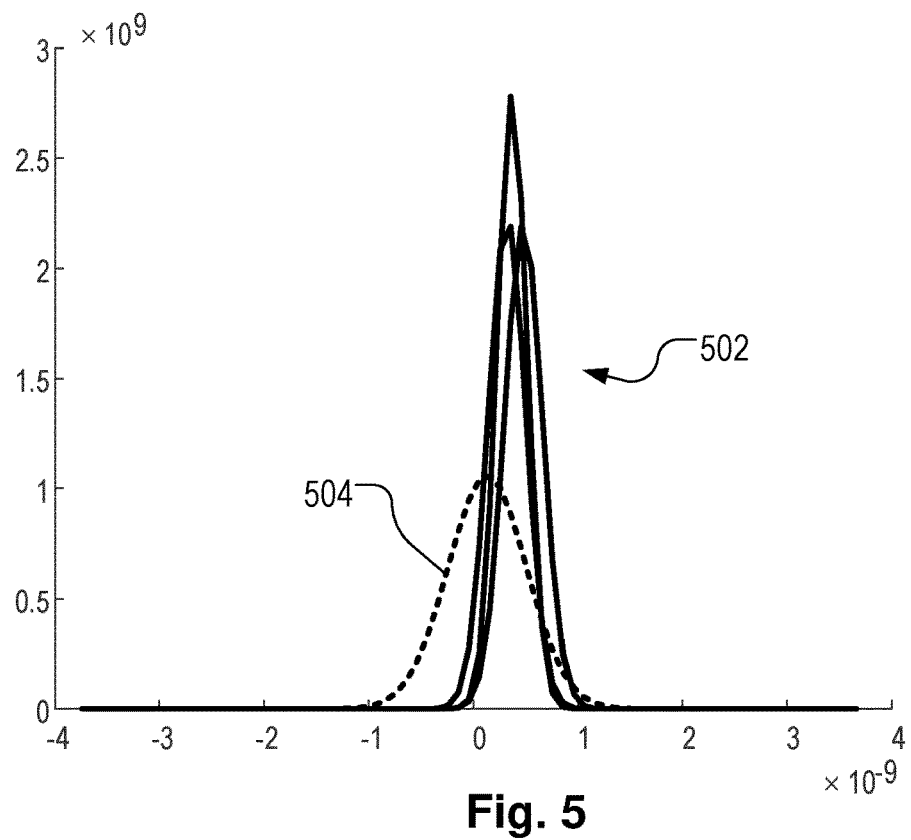
FIG. 5 depicts fits to gaussian distributions of measurements for five different groups of marks across a wafer.

FIG. 5 illustrates a fit to a gaussian distribution of measurements for five different groups of marks across a wafer. Each group is a different region across a wafer. The probability density in arbitrary units (vertical axis) is plotted 502, 504 against mark readout value in arbitrary units (horizontal axis). Marks at the edge of the wafer have higher variance than the marks in the rest of the wafer, as shown by the wider distribution of the curve 504 corresponding to the wafer-edge group, compared to the narrower distributions of the remaining four curves 502 for regions away from the edge of the wafer. Thus, there is a different standard deviation depending on mark location across the wafer.

Figure 6:
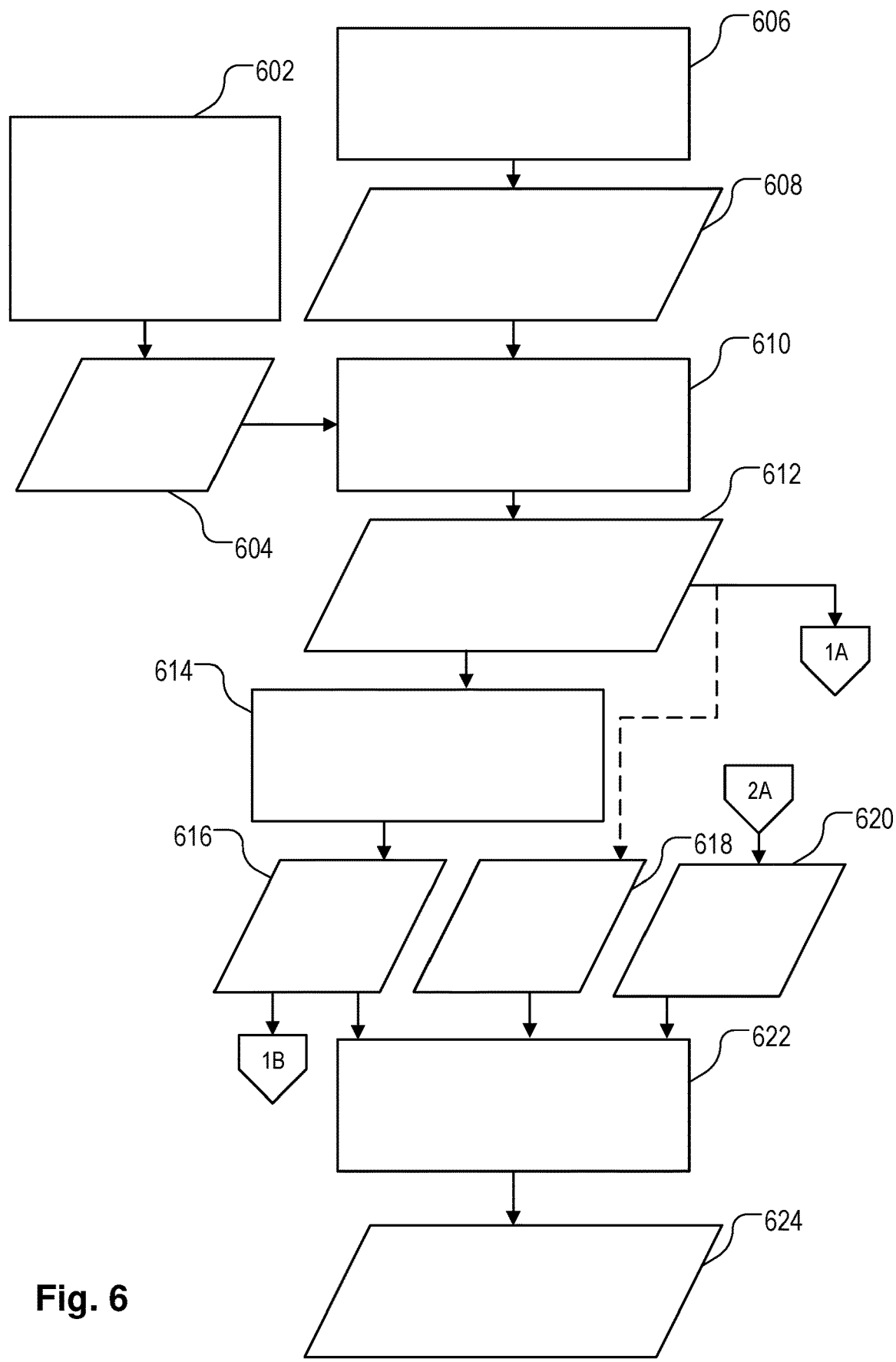
FIG. 6 is a flowchart of a method involving sample scheme generation in accordance with an embodiment.

FIG. 6 is a flowchart of a method involving sample scheme generation in accordance with an embodiment. The method has the steps:

602: In relation to the selection of locations across one or more substrate, pre-defined groups 604 are defined.

The locations in a group may together define one or more region within a field, the field being repeated across the one or more substrates. In this case, each field has the same reduced mark readout layout and operations (crossover/mutation) are at the intrafield level.

Figure 12:
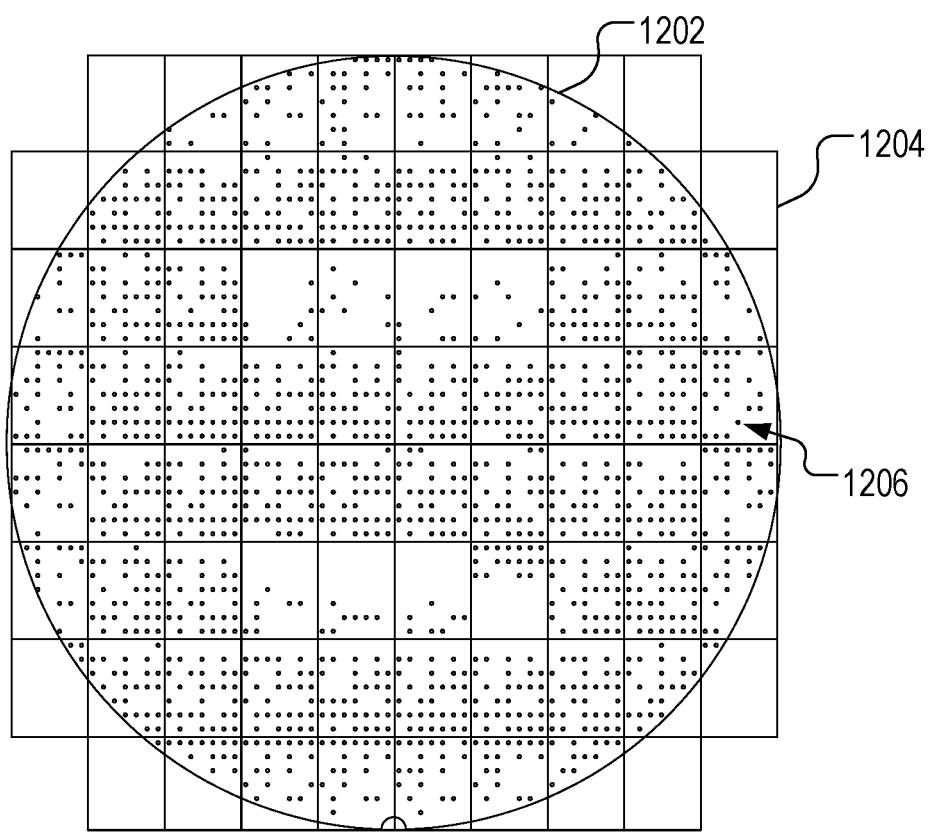
FIG. 12 depicts a reduced wafer mark readout layout produced by an embodiment.

Additionally or alternatively, a group may be defined as one or more region spanning fields across a wafer, across a wafer lot, or plurality of wafer lots. The locations in a group may together define one or more region spanning a plurality of fields across one or more substrates, the plurality of fields having different respective sub-sampling in a sampling scheme generated by the sample scheme generation algorithm. This different respective sub-sampling spanning one substrate is shown in FIG. 12.

606: Obtaining measurement data 608 associated with a set of locations across one or more substrates. In this example, all the exposed marks are read out, so that as much information as possible can be used for the optimized sample scheme generation.

610: Analyzing the measurement data 608 to determine statistically different groups 612 of the locations. The groups in this example are the pre-defined groups 604.

In the case where the locations in a group together define one or more region spanning a plurality of fields across one or more substrates (the plurality of fields having different respective sub-sampling), then the step 610 of analyzing the measurement data comprises stacking the measurement data across the spanned plurality of fields using their different respective sub-sampling to determine the statistically different groups of the locations. In this case, different fields have different reduced layout and operations (crossover/mutation) are at the interfield/wafer-wafer/lot level. This may be described as field/wafer/lot reconstruction using stacking.

As indicated by flowchart connector 1A, for the method described with reference to FIG. 7, constraints obtained at step 702 may be based on the outcome 612 of the analysis step 610.

614: Configuring an operator of a sample scheme generation algorithm based on the statistically different groups. This step outputs one or more genetic operator configuration 616. The sample scheme generation algorithm in this example is a genetic algorithm and the step of configuring an operator comprises configuring a crossover operator to swap sampling information between the determined statistically different groups. The step of configuring an operator may also comprise configuring a mutation operator to mutate sampling information in a selected determined statistically different group. The genetic operator configuration 616 may be used in other embodiments, as indicated by flowchart connection 1B.

Multi-objective genetic algorithms (MOGA) are an extension of genetic algorithms (GA). They are a class of algorithms able to optimize multi-objective optimization problems (convex or not, with or without constraints, . . . ). GA are single-objective optimization algorithms. These algorithms consider 'individuals': possible solutions for the problem one wants to solve. In this example an individual is a reduced mark readout layout. Individuals are evaluated on a fitness function. In this example the fitness function would return the calculated key performance indicators (KPIs) for a given reduced mark readout layout.

In this example, where the sample scheme generation algorithm 622 comprises a multi-objective genetic algorithm, the method further comprises obtaining a plurality of key performance indicators 620 associated with a sample scheme across the one or more substrates. The key performance indicators are used in a fitness function in the sample scheme generation algorithm. The fitness function comprises a comparison between the key performance indicators calculated for the measurement data of the set of locations and the key performance indicators calculated for an individual reduced mark readout layout.

For matching overlay between machines (during scanner calibration or qualification), one may use a fitness function returning KPI only relevant for machine performance (as: mean+3 std, 99.7 percentile for x and y for chuck 1 and chuck 2 for the average wafer and for wafer to wafer difference). One may also use a bigger set of KPI needed for diagnostics (such as intrafield, interfield, or slit fingerprint parameters).

The fitness function returns the different of these KPIs between the full mark readout layout and a generated reduced mark readout layout. The fitness function may return more complex metrics related to how reduced layouts behave (compared to the full layout) on a set of machines.

The GA uses groups of individuals (called 'populations') which vary during the iterations. Given a population at a generation X, the population at generation X+1 is obtained performing genetic operations on the individuals of generation X. The operations can be classified in three groups:

Selection: Some individual of generation X are disregarded. The remaining individuals are used as input for the following two operations. Examples of selection are tournament selection and roulette wheel.

Crossover (recombination): Two (or more) selected individuals are used to create new individuals. For instance, if the analysis step 610 indicates that there is a difference between the alignment or overlay standard deviation of the marks to the edge of wafer in respect to the marks in the rest of the wafer, then the crossover operation may be configured accordingly. Thus, given two individuals I1 and I2, a new individual is created by crossover using the edge marks present in I1 and the remaining marks present in I2.

Mutation: One selected individual is used to create a new individual. For instance, if the analysis step 610 shows that the standard deviation for the marks present in the lower quadrants of wafers is significantly higher than for the marks present in the upper quadrants of wafers, then one could implement mutation accordingly. For example, the mutation operation may be configured to increase the number of marks read out in the lower quadrant of the wafer.

These genetic operations may have constant parameters or parameters that change over the generations.

In the MOGA other operators may be implemented (in addition to the ones described in relation to step 622) to provide reduced mark readout layouts. For instance, one could implement field reconstruction: given a set of fields, sub-sample each of them such that no field in the set has all marks readout (i.e. no intrafield map can be created) but the combination of the marks readout in these fields allows to recreate a field.

Based on the outcome 612 of the analysis step 610, constraints 618 may be added to the solutions created by the MOGA. A constraint 618 is associated with a sample scheme across the one or more substrates. The constraint 618 is used as an input to the sample scheme generation algorithm 622. The constraint may be based on the analysis 610. For instance, if the analysis step 610 shows that there is a remarkable difference 612 between the marks present in different field columns, then one could force the MOGA to create solutions (i.e. reduced mark readout layouts) such that no field column disappears in the reduced mark readout layout. This means that it is allowed to have marks missing in a column but it is not allowed to remove all marks in a column.

Because the fitness function returns more than one KPI, MOGA can return solutions satisfying all these KPIs. The MOGA of sample scheme generation step 622 would then return reduced field mark readout layouts 624. Thus, the sample scheme generation algorithm is used to generate the optimized sample scheme 624.

Figure 7:
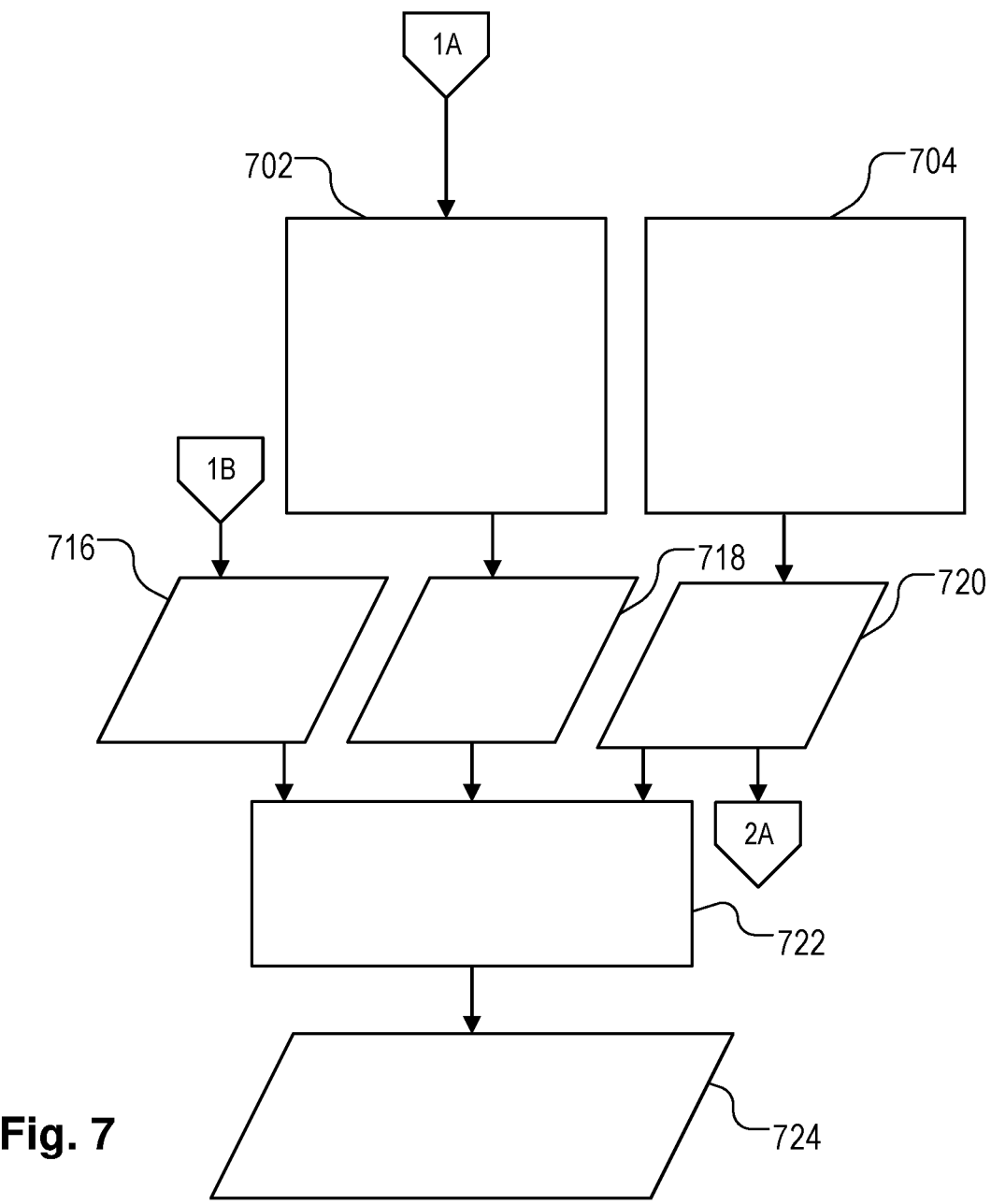
FIG. 7 is a flowchart of a method involving a multi-objective genetic algorithm in accordance with an embodiment.

FIG. 7 is a flowchart of a method involving a MOGA in accordance with an embodiment. The method has the steps:

702: Obtaining a constraint 718 associated with a sample scheme across one or more substrates. As indicated by flowchart connector 1A, these constraints may be based on the outcome 612 of the analysis step 610.

704: Obtaining a plurality of key performance indicators 720 associated with a sample scheme across one or more substrates. The KPIs 720 may be used in the embodiment described with reference to FIG. 6, as shown by flowchart connector 2A.

722: Using the constraint 718 and/or the plurality of key performance indicators 720 in a sample scheme generation algorithm comprising a multi-objective genetic algorithm. A genetic operator configuration 716 may be configured in accordance with step 614 of FIG. 6, as indicated by the flowchart connector 1B.

The sample scheme generation algorithm is used to generate the optimized sample scheme (reduced mark readout layout) 724. The optimized mark readout layout that allows faster testing without compromising test KPI. This leads to reduced set-up, recovery and drift calibration/verification times.

Figure 8:
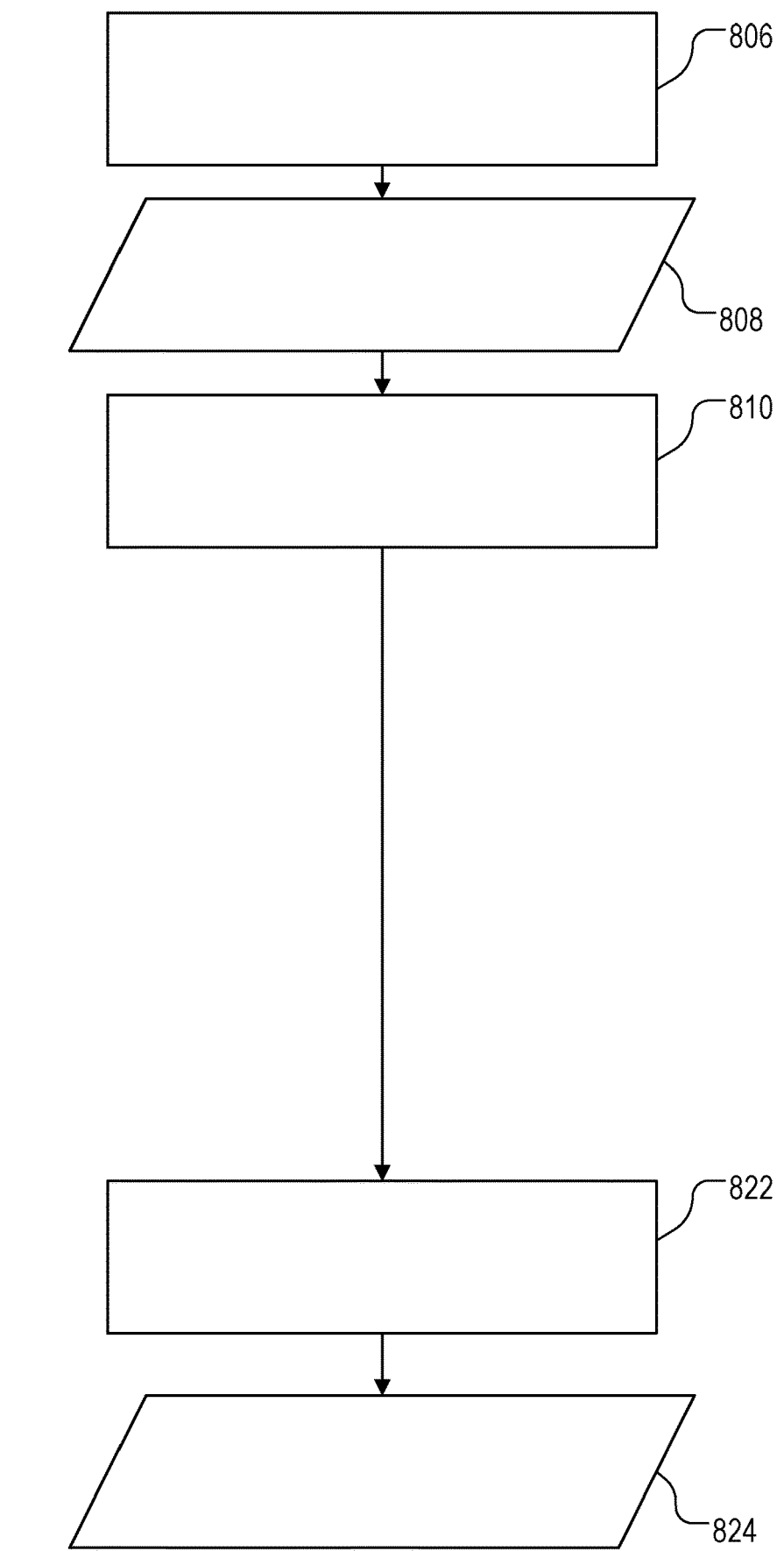
FIG. 8 is a flowchart of a method involving sample scheme optimization in accordance with an embodiment.

FIG. 8 is a flowchart of a method involving sample scheme optimization in accordance with an embodiment. The method has the steps:

806: Obtaining measurement data 808 associated with a set of locations across one or more substrates. The locations define one or more region spanning a plurality of fields across one or more substrates, the plurality of fields having different respective sub-sampling in the sampling scheme.

810: Analyzing the measurement data by stacking the measurement data across the spanned plurality of fields using their different respective sub-sampling.

822: Optimizing a sample scheme based on the analysis of step 810.

The sample scheme generation algorithm is used to generate the optimized sample scheme (reduced mark readout layout) 824. When the sample scheme generation algorithm is a MOGA, different fields have different reduced layout and operations (crossover/mutation) are at the interfield/wafer-wafer/lot level. This may be described as field/wafer/lot reconstruction using stacking. The optimized mark readout layout that allows faster testing without compromising test KPI. This leads to reduced set-up, recovery and drift calibration/verification times.

Figure 9:
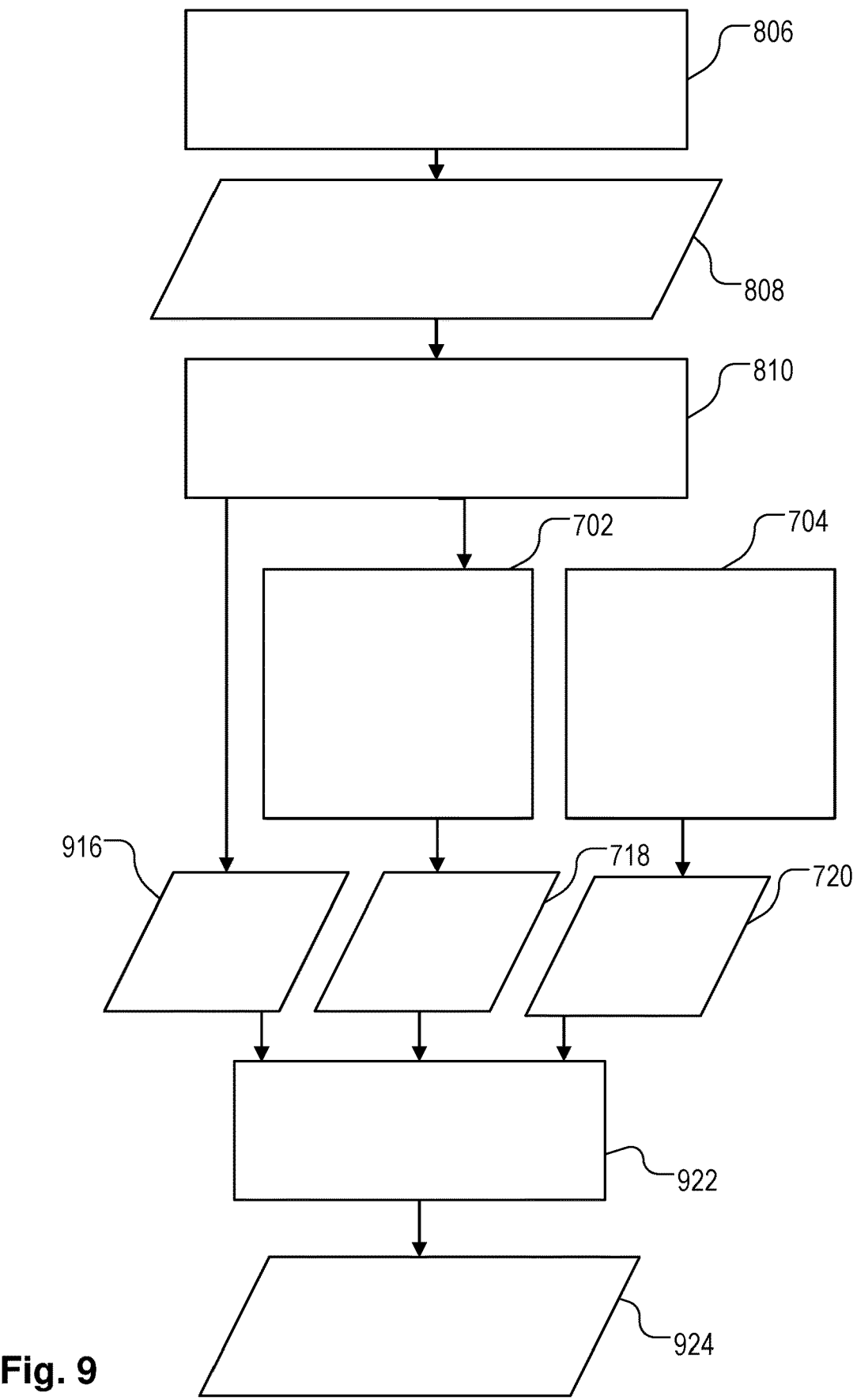
FIG. 9 is a flowchart of a method involving a multi-objective genetic algorithm combining the methods of FIG. 7 and FIG. 8 in accordance with an embodiment.

FIG. 9 is a flowchart of a method involving a MOGA combining the methods of FIG. 7 and FIG. 8 in accordance with an embodiment.

With reference to FIG. 9, the method has the steps in common with FIGS. 7 and 8 labeled with the same reference numerals:

806: Obtaining measurement data 808 associated with a set of locations across the one or more substrates. The locations define one or more region spanning a plurality of fields across one or more substrates, the plurality of fields having different respective sub-sampling in the sampling scheme.

810: Analyzing the measurement data by stacking the measurement data across the spanned plurality of fields using their different respective sub-sampling.

702: Obtaining a constraint 718 associated with a sample scheme across one or more substrates. These constraints are based on the outcome of the analysis step 810.

704: Obtaining a plurality of key performance indicators (KPIs) 720 associated with a sample scheme across one or more substrates.

922: Optimizing a sample scheme based on the analysis. This step 922 may use the constraint 718 and/or the plurality of key performance indicators 720 in a MOGA. The constraint may be based on the analysis 810. For instance, if the analysis step 810 shows that there is a remarkable difference between the marks present in different field columns, then one could force the genetic algorithm to create solutions (i.e. reduced mark readout layouts) such that no field column disappears in the reduced mark readout layout. This means that it is allowed to have marks missing in a column but it is not allowed to remove all marks in a column. This step 922 may involve configuring a crossover operator of a sample scheme generation algorithm to swap sampling information between the fields. This step may involve configuring a mutation operator of a sample scheme generation algorithm to mutate sampling information in a selected field. When the sample scheme generation algorithm is a genetic algorithm, different fields have different reduced layout and operations (crossover/mutation) are at the interfield/wafer-wafer/lot level. This may be described as field/wafer/lot reconstruction using stacking. The operator configuration 916 is based on the analysis step 810.

The sample scheme optimization step 922 is used to produce the reduced mark readout layout 924.

Figure 10:
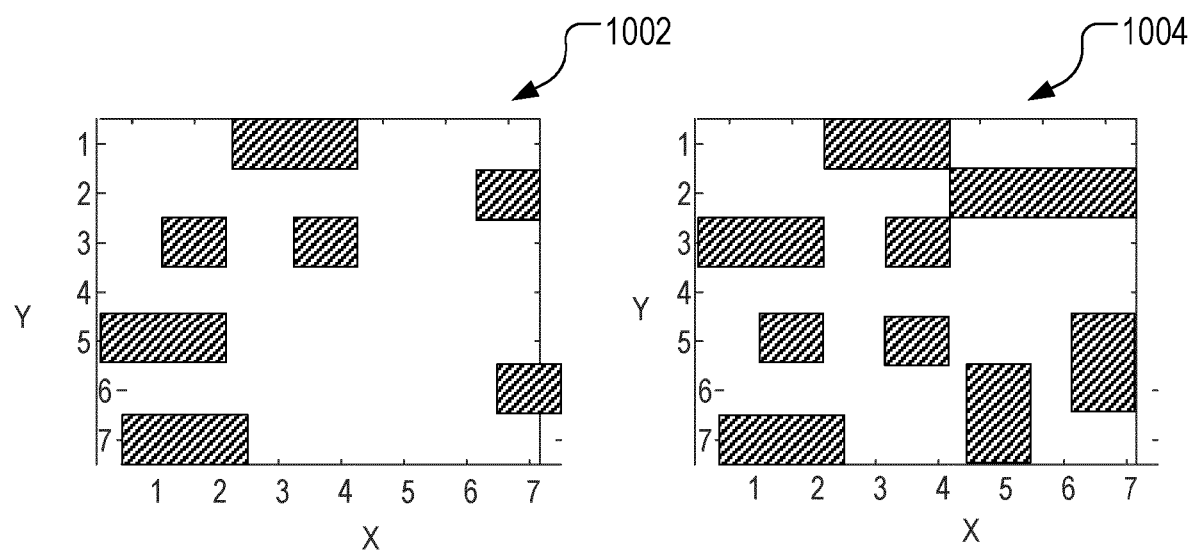
FIG. 10 depicts two different field mark readout layouts produced by an embodiment.

FIG. 10 depicts two different field mark readout layouts produced by an embodiment. The field mark layouts of FIG. 10 are returned by the MOGA implemented for overlay mark sampling for matching different scanners. Each mark is represented by a cross-hatched rectangle. The left most field 1002 has 10 marks. The rightmost field 1004 has 16 marks.

Figure 11:
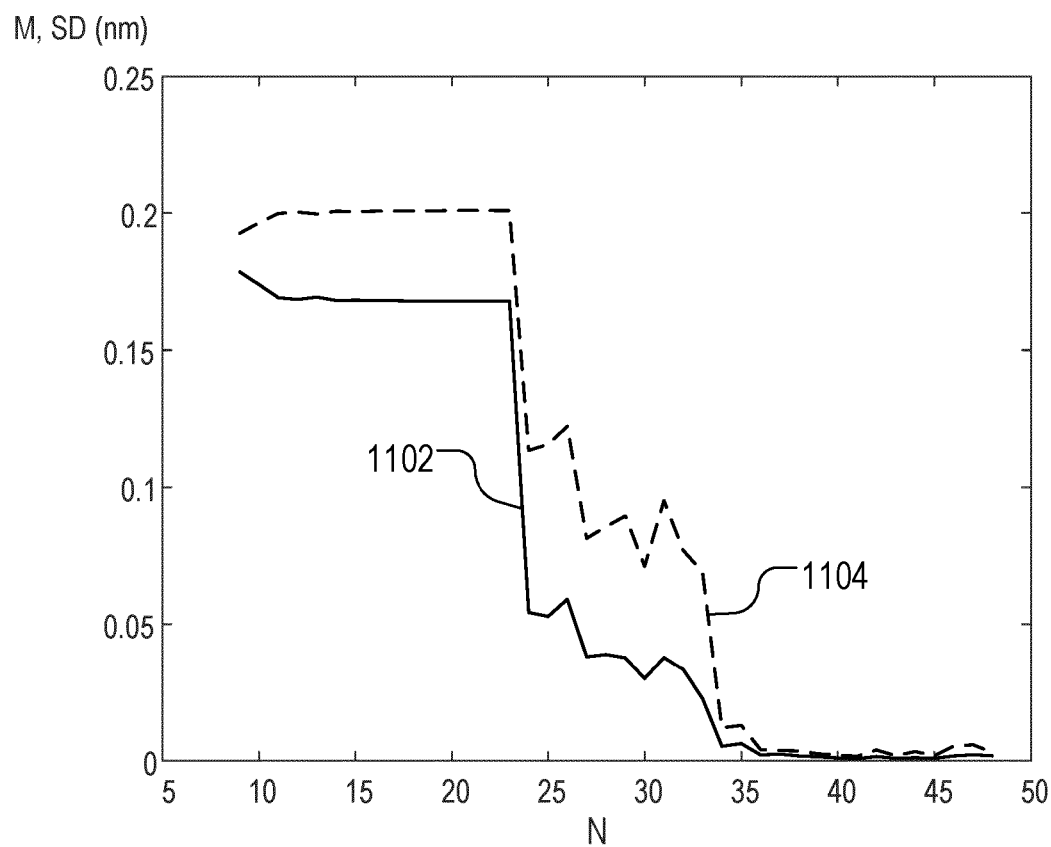
FIG. 11 is a Pareto front for fields having the same reduced mark readout layout compared to a full mark readout layout.

FIG. 11 is a Pareto front for fields have the same reduced mark readout layout compared to a full mark readout layout. A MOGA returns much data, the most important data of which are the reduced layouts. But with the remaining data one can plot Pareto fronts (and other plots). The aim of a Pareto front is to see how different objectives are related to each other. This information can be used for example to understand the problem better or to improve the MOGA. These are plots showing how the different KPIs are related to each other in the considered optimization problem. With reference to FIG. 11, a Pareto front is shown for an example where all fields have the same mark readout layout. The horizontal axis the number of marks (N) read out for each field. The vertical axis is delta mean (M) and standard deviation (SD) in nm between the fully sampled mark readout layout and the reduced (optimized) mark readout layout. These plots of mean 1102 and standard deviation 1104 (dashed line) show that there is a sudden increase in performance if one reads out 24 or more marks per field, compared to fewer marks per field.

In a first approach, the locations in a group may together define one or more region within a field, the field being repeated across the one or more substrates gives an indication of how a reduced number of readout marks affects the considered KPIs. For instance, it may be acceptable to have a decrease in performance not higher than +/−5% (we call this 'degradation'). This means that for each KPI, the value returned by the reduced layout is at most +5% or −5% compared to the KPI returned by the full layout.

As described above, in a second approach, additionally or alternatively to the first approach, a group may be defined as one or more region spanning fields across a wafer, across a wafer lot, or plurality of wafer lots. The locations in a group may together define one or more region spanning a plurality of fields across one or more substrates, the plurality of fields having different respective sub-sampling in a sampling scheme generated by the sample scheme generation algorithm. In this case the sample scheme generation or optimization can return a reduced layout having the same performance as the first approach, but reading out less marks. For instance, if the considered test has 70 fields a reduced layout with 10 marks per field is produced (that is, with a totality of 700 marks readout) and +/−5% degradation, then the second approach can return another layout with +/−5% degradation which has a totality of less than 700 marks read out.

In the MOGA other operators may be implemented (in addition to the ones described in relation to step 622) to provide reduced mark readout layouts. For instance, one could implement field reconstruction: given a set of fields, sub-sample each of them such that no field in the set has all marks readout (i.e. no intrafield map can be created) but the combination of the marks readout in these fields allows to recreate a field.

FIG. 12 depicts a reduced wafer mark readout layout produced by an embodiment described with reference to FIGS. 6 and 7. A wafer map 1202 is divided into fields 1204. Within the wafer map 1202, a mark layout is shown with small dots representing mark readouts. This is an optimized mark readout layout that allows faster testing without compromising test KPI. This leads to reduced set-up, recovery and drift calibration/verification times.

Embodiments may be applied to all tests where marks are read out from exposed wafers. The methods described above return a set of reduced mark readouts such that the KPIs returned by each test have no degradation (i.e. they are equal to the values returned when all marks are readout) or a small degradation. This, in turn, reduces set-up and recovery times.

The measurements referred to in this document may correspond to the obtaining of values of any parameter having a spatial distribution (fingerprint) across a plane associated with, or defined by one or more substrates. For example the measurements may refer to values of overlay error, Critical Dimension, focus, Edge Placement Error as measured by inspection of product features and/or target features on a processed substrate. Alternatively the measurements may refer to values of a dose, focus, (reticle) mark position, or aberration level of the projection system PS as measured by a sensor at multiple locations across an optical plane of the projection system PS. Typically the optical plane is the image plane of the projection system PS (where substrates are normally positioned when being exposed by the lithographic apparatus). In most cases the measurements are performed across a field comprised within the optical plane of the lithographic apparatus, the field being the extend across the optical plane which is illuminated by the lithographic apparatus (during exposure operation). Hence the embodiments in this document are not limited to measurements, readout values and measurement data obtained by inspection of structures on a substrate, but any measurement and/or measurement result obtained across an optical plane of a lithographic apparatus and/or a substrate by any sensing system is in scope of the invention.

In case of measurements across the field within the optical plane, the sensor is typically a dose, aberration or image sensor. The image sensor is typically a sensor configured to measure the relative position of a mark on the reticle with respect to the substrate table WT. In case the sensor is integrated within the substrate table measurements across the field can be performed by moving the substrate table to positions where the sensor measures the parameter of interest at the desired locations within the field.

However measuring the parameter of interest at many locations may be too time consuming and not required for obtaining a sufficiently accurate behavior of the parameter of interest across the field.

Given the obtained sensor readout data from previous tests of all locations (such as analog to step 606 in FIG. 6), the locations where the sensor has measured the parameter of interest can be grouped in different ways. For instance, one can group locations across the field according to: locations which are in different field columns/rows/locations. For the selected grouping one can plot the distributions (or the fit to a given distribution, like the Gaussian distribution) of the locations in each group to determine statistically different groups. Examples of statistical differences are:

The locations in a grouping have different means of their associated sensor readout values;

The locations in a grouping have different std (standard deviations) of their associated sensor readout values; and No grouping shows statistical differences in their associated readout values.

For instance, it may be determined that sensor readouts at locations in different columns across the field have different means, or that locations at the edge of the field have higher variance than the locations in the rest of the field.

Also in case the measurements are related to intra-field sensor based measurements instead of inspection of target structures the same methods as described previously may be utilized to configure a sample scheme generation algorithm, in this case the sample scheme generation algorithm is configured to define locations across the field where the sensor should measure a parameter of interest (aberration(s), dose, mark position, focus and the like).

In an embodiment there is provided a method comprising: obtaining measurement data associated with a plurality of measurements performed across one or more fields; analyzing the measurement data to determine statistically different locations within said one or more fields; and configuring an operator of a sample scheme generation algorithm based on the statistically different locations.

Optionally the locations define one or more regions spanning a plurality of fields, the plurality of fields having different respective sub-sampling in a sampling scheme generated by the sample scheme generation algorithm; and the step of analyzing the measurement data comprises stacking the measurement data across the spanned plurality of fields using their different respective sub-sampling to determine the statistically different locations.

Optionally the sample scheme generation algorithm comprises a genetic algorithm.

Optionally the step of configuring an operator comprises configuring a crossover operator to swap sampling information between the determined statistically different locations.

Optionally the step of configuring an operator comprises configuring a mutation operator to mutate sampling information in a selected determined statistically different locations.

Optionally the sample scheme generation algorithm comprises a multi-objective genetic algorithm and the method further comprises:

obtaining a constraint associated with a sample scheme across the field; and using the constraint as an input to the sample scheme generation algorithm.

Optionally the sample scheme generation algorithm comprises a multi-objective genetic algorithm and the method further comprises: obtaining a plurality of key performance indicators associated with a sample scheme across the field; and using the key performance indicators in a fitness function in the sample scheme generation algorithm.

Optionally the fitness function comprises a comparison between the key performance indicators calculated for the measurement data of the set of locations and the key performance indicators calculated for a reduced sample scheme individual.

In the above embodiments, the reduced layout for calibration and qualification of scanner performance, once determined, has been fixed. As such, the readout is static: measurements continue to be made even if they are no longer adding any significant information. The readout strategy is defined a-priori and cannot be changed.

By way of a specific example, a machine matched overlay test (a qualification or verification test for overlay) may comprise exposing and measuring six wafers under the same conditions: 3 exposed on a first chuck (e.g., of a twin stage system) and the other 3 exposed on a second chuck. In the above embodiments, the very same mark readout may be applied to all 6 wafers even if all the wafers exposed on the same chuck have very similar measured mark values within the inner fields.

It is proposed that a flexible sampling scheme or measurement scheme approach may be performed. Such a flexible sampling scheme may comprise, for example, measuring all the marks on the first wafers exposed on the first chuck. Then, for the second wafer exposed on the first chuck, measurement of marks may begin centrally (e.g., marks in the inner fields), with an immediate check for each measurement to establish the degree of variation of the measured value from that of the corresponding mark on the first wafer. If this variation is sufficiently small (within specification) for at least one or a first few marks (e.g., for at least a predetermined minimum number of marks), then it may be decided to skip measurement of some marks (e.g., other unmeasured marks within inner fields) and instead immediately begin sampling fields where more variation is expected (e.g., at or near the edge). Depending on the level of variation at these edge fields, a dense sampling may be chosen for the fields expected to have a large degree of variation or a less dense sampling for the fields expected to have a small degree of variation.

More generally, such an approach may comprise a "previous measurement based" approach. For any tests, validations or calibrations for which more than one wafer is measured, all the marks on a first set of wafers (e.g., comprising the first one or more wafers) may be measured. The acceptable boundaries of the measurement error are known. For a second set of wafers (e.g., the wafers after the first set of wafers) a flexible sampling is performed. This may comprise measuring only a few marks (a first subset) on the first wafer of the second set of wafers. If the difference in the measured values of these marks and the measured values of the corresponding marks in the first set of wafers (when the first set comprises more than one wafer, corresponding mark values may be averaged or otherwise combined) is within the measurement error boundaries, then measurement of the current wafer may end and measurement of the next wafer of the second set may begin immediately. If, however, the measurement values on the second wafer are outside the boundaries, then more marks on the current wafer are measured. In such an embodiment the first marks measured may be those expected to have the greatest variation between wafers.

Alternatively, a determination of the first values being within specification may trigger the end of measurement of a specific region (e.g., a first region or central region) of the wafer and for measurement to begin for another region (e.g., a second region or edge region, also referred to as peripheral region) of the same wafer; in such an embodiment the first marks measured may be those expected to have the least, or at least less, variation between wafers. The same flexible sampling scheme approach may then be taken with this second region such that some or all marks in this region are measured depending on variation of the measured values of a first few marks with respect to corresponding marks in the first set and the allowed measurement error. The measurement may then proceed with either the next region (if more than two) or the next wafer.

Subsequent wafers in the second set may be measured using the same sampling scheme devised for the first wafer of the second set, or else a flexible approach may be taken for each wafer of the second set using the same approach for each one, such that the sampling scheme is flexible between wafers.

In another embodiment, a dynamic model-based approach for determining a flexible sampling scheme or measurement scheme is proposed. Once again, such a method may be appropriate for any tests, validations or calibrations for which more than one wafer is measured. Alternatively or in addition, such a method may be used for any tests where a parameter of interest such as overlay is tracked: e.g., such a strategy may be employed to check WEC (Wafer Error Correction) maps. This embodiment may use a 'dynamic model' of what is going to be measured. The term 'dynamic model' in this context may be taken to mean a function which outputs a regressed or fitted model extrapolating and/or interpolating values for wafer locations for which no corresponding measurement data is available (unmeasured locations), based on a relatively sparse measurement data set (measurement data of only a few locations). For example, a dynamic model may fit a given interfield shape based on a few sparse measurements.

Such a method may comprise a first step of measuring a few marks from a first wafer (or first set of wafers) and use them to fit the dynamic model to obtain a fitted model of the wafer. The next step comprises measuring further marks and comparing each measured value, or a revised value of the fit of the entire wafer taking into account the new measurement value, to that predicted by the fitted model. If a sufficient number of measured values are within given tolerances, then measuring can be stopped. It should be appreciated that measurements may be performed until a level of confidence exceeds a certain criterion. This way of working is similar to that of Bayesian inference techniques and active learning. In these techniques new data acquisition aims to minimize the uncertainty of a model. As such, the method may comprise dynamically updating a level of confidence (an uncertainty metric) associated with unmeasured locations on a wafer under measurement based on wafers already measured; and dynamically available measurement results for the current wafer under measurement.

A decision as to which mark should be the next mark to be measured may be made in accordance with Gaussian processes; e.g., the next mark to be measured may be:
i. the mark having the highest uncertainty in the fitted model;
ii. the mark having the highest chance of comprising a minimum/maximum value (min/max peak) of the model.

In an embodiment, the dynamic model can evolve over time to adapt for drift. For example, assuming that the initial dynamic model is of the form: $f=c_1 X^2+c_2 Y^2$ (where X and Y are wafer coordinates of a mark). The model, once fitted, returns an interfield fitted model. The first measurements on a wafer enable determination of $c_1$ and $c_2$ and therefore to extrapolate values for non-measured locations of the wafer. However, if the value predicted by this fitted model is far from what is measured (differs by a threshold value or percentage), then the dynamic model may change the actual model, for example, to updated model $f=c_1 X^2+c_2 Y^2+c_3 X$. If this updated model f' fits the measured data better than f, then this may be chosen as the initial dynamic model for the following wafers.

The evolution (change over time) of model may be based upon:
- previous knowledge: if, for example, it is known that the degradation of the wafer table adds terms to the wafer table model, then model terms could be added while the wafer table degrades;
- software: a genetic programming software could select the best model composed by a finite set of given functions.

If, after having measured all the marks, the level of confidence of the measurement of the current wafer (compared to the fitted model) does not exceed a certain threshold, then the function defining the dynamic model may be changed. This allows the model to adapt for drift.

Another approach for flexible sampling may comprise searching for a given point. Such a method may comprise searching for a specific shape (e.g., based on prior knowledge and known behavior patterns), which may vary in orientation, shifts etc., on a wafer. Once the shape is found, the location of its maximum may be determined and/or characterized with the minimum number of measurements. This may be achieved by sampling the wafer the minimum number of times needed to fit the given shape with its orientation, shift, etc., and then sample the wafer within this fitted shape at a region where maximum may be expected to be found.

This latter approach may also be suitable for qualification of scanner parts (e.g., rather than wafer measurements). For example, when immersion hoods are produced they have to be tested to check if all holes (i.e., those to provide water, to remove water and to blow $CO_2$) are open and comprise no contamination affecting the flow through them. This may be performed using a device which measures the flow output from these holes when pressure is applied. In existing technologies, this measurement scheme may follow a fixed (e.g., 6×6) grid for all holes such that each hole is sampled over 36 points. If the hole is properly open and unblocked, then the 6×6 flow measurement values should define a Gaussian shape. As such, a Gaussian shape may be the specific shape searched for in this embodiment with a peak at the center; applying such a flexible measurement scheme to the test may reduce the number of measurements for each hole from 36 to a minimum of 5 (e.g., describing a Gaussian shape), reducing the testing time.

Figure 13:
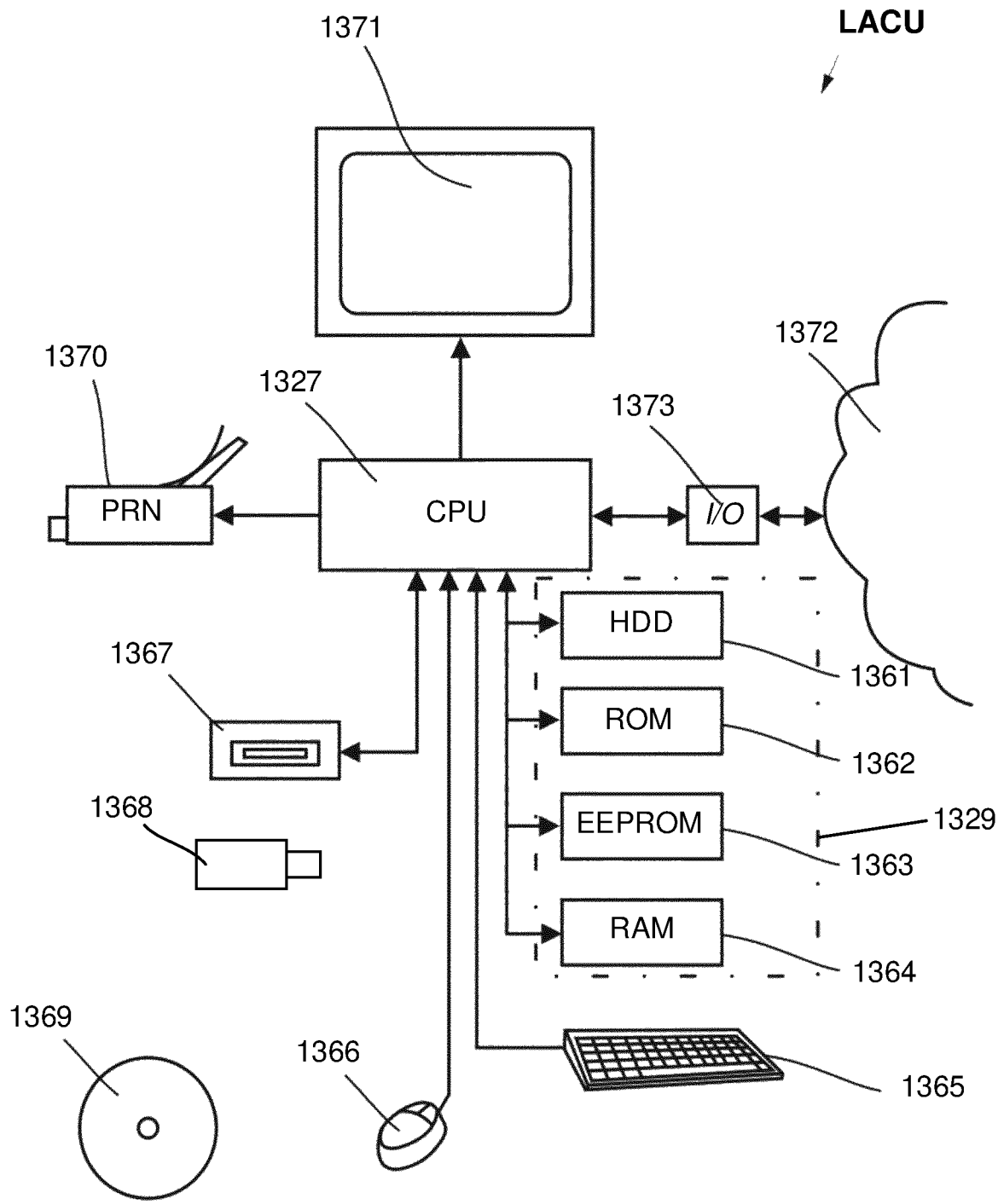

The steps of the methods described above can be automated within the lithography apparatus control unit LACU shown in FIG. 1 or in an inspection apparatus, such as an angularly resolved scatterometer. This unit LACU may include a computer assembly as shown in FIG. 13. The computer assembly may be a dedicated computer in the form of a control unit in embodiments of the assembly according to the invention or, alternatively, be a central computer controlling the lithographic projection apparatus. The computer assembly may be arranged for loading a computer program product comprising computer executable code. This may enable the computer assembly, when the computer program product is downloaded, to control aforementioned uses of a lithographic apparatus with embodiments of the level and alignment sensors AS, LS.

Memory 1329 connected to processor 1327 may comprise a number of memory components like a hard disk 1361, Read Only Memory (ROM) 1362, Electrically Erasable Programmable Read Only Memory (EEPROM) 1363 or Random Access Memory (RAM) 1364. Not all aforementioned memory components need to be present. Furthermore, it is not essential that aforementioned memory components are physically in close proximity to the processor 1327 or to each other. They may be located at a distance away The processor 1327 may also be connected to some kind of user interface, for instance a keyboard 1365 or a mouse 1366. A touch screen, track ball, speech converter or other interfaces that are known to persons skilled in the art may also be used.

The processor 1327 may be connected to a reading unit 1367, which is arranged to read data, e.g. in the form of computer executable code, from and under some circumstances store data on a data carrier, like a solid-state drive 1368 or a CDROM 1369. Also DVD's or other data carriers known to persons skilled in the art may be used.

The processor 1327 may also be connected to a printer 1370 to print out output data on paper as well as to a display 1371, for instance a monitor or LCD (Liquid Crystal Display), of any other type of display known to a person skilled in the art.

The processor 1327 may be connected to a communications network 1372, for instance a public switched telephone network (PSTN), a local area network (LAN), a wide area network (WAN) etc. by means of transmitters/receivers 1373 responsible for input/output (I/O). The processor 1327 may be arranged to communicate with other communication systems via the communications network 1372. In an embodiment of the invention external computers (not shown), for instance personal computers of operators, can log into the processor 1327 via the communications network 1372.

The processor 1327 may be implemented as an independent system or as a number of processing units that operate in parallel, wherein each processing unit is arranged to execute sub-tasks of a larger program. The processing units may also be divided in one or more main processing units with several sub-processing units. Some processing units of the processor 1327 may even be located a distance away of the other processing units and communicate via communications network 1372. Connections between modules can be made wired or wireless.

The computer system can be any signal processing system with analogue and/or digital and/or software technology arranged to perform the functions discussed here.

The term substrate used herein may refer to a wafer or a patterning device such as a reticle. In lithography, a reticle has a pattern which is imaged to a target substrate, such as a wafer.

Further embodiments of the invention are disclosed in the list of numbered clauses below:
1. A method comprising:
    obtaining measurement data associated with a set of locations across one or more substrates;
    analyzing the measurement data to determine statistically different groups of the locations; and
    configuring an operator of a sample scheme generation algorithm based on the statistically different groups, or the sample scheme generation algorithm based on the statistically different groups.
2. The method of clause 1, wherein the locations in a group together define one or more region within a field, the field being repeated across the one or more substrates.
3. The method of clause 1, wherein:
    the locations in a group together define one or more region spanning a plurality of fields across one or more substrates, the plurality of fields having different respective sub-sampling in a sampling scheme generated by the sample scheme generation algorithm; and the step of analyzing the measurement data comprises stacking the measurement data across the spanned plurality of fields using their different respective sub-sampling to determine the statistically different groups of the locations.

4. The method of any preceding clause wherein the sample scheme generation algorithm comprises a genetic algorithm.

5. The method of clause 4, wherein the step of configuring an operator comprises configuring a crossover operator to swap sampling information between the determined statistically different groups.

6. The method of clause 4, wherein the step of configuring an operator comprises configuring a mutation operator to mutate sampling information in a selected determined statistically different group.

7. The method of any of clauses 4 to 6, wherein the sample scheme generation algorithm comprises a multi-objective genetic algorithm and the method further comprises:
   obtaining a constraint associated with a sample scheme across the one or more substrates; and
   using the constraint as an input to the sample scheme generation algorithm.

8. The method of any of clauses 4 to 7, wherein the sample scheme generation algorithm comprises a multi-objective genetic algorithm and the method further comprises:
   obtaining a plurality of key performance indicators associated with a sample scheme across the one or more substrates; and
   using the key performance indicators in a fitness function in the sample scheme generation algorithm.

9. The method of clause 8, wherein the fitness function comprises a comparison between the key performance indicators calculated for the measurement data of the set of locations and the key performance indicators calculated for a reduced sample scheme individual.

10. A method comprising:
    obtaining a constraint and/or a plurality of key performance indicators associated with a sample scheme across one or more substrates; and
    using the constraint and/or the plurality of key performance indicators in a sample scheme generation algorithm comprising a multi-objective genetic algorithm.

11. The method of clause 10, further comprising:
    obtaining measurement data associated with a set of locations across the one or more substrates;
    analyzing the measurement data; and
    optimizing a sample scheme based on the analysis,
    wherein the locations define one or more region spanning a plurality of fields across one or more substrates, the plurality of fields having different respective sub-sampling in the sampling scheme;
    wherein the constraint is based on the analysis; and
    wherein the step of analyzing the measurement data comprises stacking the measurement data across the spanned plurality of fields using their different respective sub-sampling.

12. The method of clause 11, wherein the step of optimizing the sample scheme comprises configuring a crossover operator of a sample scheme generation algorithm to swap sampling information between the fields.

13. The method of clause 11, wherein the step of optimizing the sample scheme comprises configuring a mutation operator of a sample scheme generation algorithm to mutate sampling information in a selected field.

14. A method comprising:
    obtaining measurement data associated with a set of locations across one or more substrates;
    analyzing the measurement data; and
    optimizing a sample scheme based on the analysis,
    wherein the locations define one or more region spanning a plurality of fields across one or more substrates, the plurality of fields having different respective sub-sampling in the sampling scheme; and
    wherein the step of analyzing the measurement data comprises stacking the measurement data across the spanned plurality of fields using their different respective sub-sampling.

15. A lithographic apparatus specifically adapted to carry out the steps of the method of any of clauses 1 to 9, or 10 to 13, or 14.

16. An inspection apparatus specifically adapted to carry out the steps of the method of any of clauses 1 to 9, or 10 to 13, or 14.

17. A computer program comprising computer readable instructions which, when run on suitable computer apparatus, cause the computer apparatus to perform the method of any one of clauses 1 to 9, or 10 to 13, or 14.

18. A computer program product comprising the computer program of clause 17.

19. A method comprising:
    obtaining measurement data associated with a set of locations; across one or more fields, typically comprised within an optical plane;
    analyzing the measurement data to determine statistically different groups of the locations; and
    configuring an operator of a sample scheme generation algorithm based on the statistically different groups.

20. The method of clause 19, wherein the locations in a group together define one or more regions within the field.

21. The method of clause 19, wherein:
    the locations in a group together define one or more region spanning a plurality of fields, the plurality of fields having different respective sub-sampling in a sampling scheme generated by the sample scheme generation algorithm; and
    the step of analyzing the measurement data comprises stacking the measurement data across the spanned plurality of fields using their different respective sub-sampling to determine the statistically different groups of the locations.

22. The method of any of clauses 19 to 21, wherein the sample scheme generation algorithm comprises a genetic algorithm.

23. The method of clause 22, wherein the step of configuring an operator comprises configuring a crossover operator to swap sampling information between the determined statistically different groups.

24. The method of clause 22, wherein the step of configuring an operator comprises configuring a mutation operator to mutate sampling information in a selected determined statistically different group.

25. The method of any of clauses 22 to 24, wherein the sample scheme generation algorithm comprises a multi-objective genetic algorithm and the method further comprises: —obtaining a constraint associated with a sample scheme across the field; and
    using the constraint as an input to the sample scheme generation algorithm.

26. The method of any of clauses 22 to 25, wherein the sample scheme generation algorithm comprises a multi-objective genetic algorithm and the method further comprises: —obtaining a plurality of key performance indicators associated with a sample scheme across the field; and using the key performance indicators in a fitness function in the sample scheme generation algorithm.

27. The method of clause 26, wherein the fitness function comprises a comparison between the key performance indicators calculated for the measurement data of the set of locations and the key performance indicators calculated for a reduced sample scheme individual.

28. The method of any of clauses 19 to 27, wherein the measurement data comprises values of a parameter measured across the field by a sensor within an optical plane.

29. The method of clause 28, wherein the parameter is one of: an aberration level, a dose, a focus level or a detected position of a mark.

30. A method of determining a flexible measurement scheme defining a flexible subset of measurement locations relating to one or more objects or regions of an object, the method comprising:

obtaining measurement data relating to measurements at one or more of said measurement locations;
obtaining characteristic data relating to a characteristic of the one or more objects or the regions of the object; and
determining the flexible measurement scheme based on the characteristic data and the measurement data.

31. The method of clause 30, wherein said measurement data provides information for describing variation of a parameter described by the measurement data according to a criterion.

32. The method of clause 30 or 31, said measurement data comprising a first set of measurements and a subsequent set of measurements, wherein the characteristic data relates to the first set of measurements and associated tolerance margin, the first set of measurements being associated with a first proper subset of the one or more objects or the regions of the object; and said method comprises: comparing one or more subsequent measurement values comprised in the subsequent set of measurements to respective corresponding first measurement values comprised in the first set of measurements; and determining the flexible measurement scheme based on whether a difference of the one or more subsequent measurement values and the respective corresponding first measurement values is within said tolerance margin.

33. The method of clause 32, wherein determining the flexible measurement scheme comprises obtaining said subsequent measurement values by sequentially measuring an unmeasured measurement location of the measurement locations on an object or region thereof presently under measurement; and determining whether the number of measurements performed on the object or region thereof presently under measurement is sufficient based on whether said difference is within said tolerance margin.

34. The method of clause 33, when there are further objects or regions thereof to be measured, beginning measurement of a subsequent object or region thereof.

35. The method of any of clauses 32 to 34, wherein the one or more objects comprise at least a first region and a second region, such that the difference in said first region is expected to vary less than the difference in said second region.

36. The method of clause 35, wherein said step of determining the flexible measurement scheme is individually performed for said first region and second region of an object.

37. The method of clause 35 or 36, wherein said first region comprises a central region and said second region comprises a peripheral region of the one or more objects.

38. The method of any of clauses 32 to 37, wherein the flexible measurement scheme determined for a first of the subsequent objects is performed on each of the other subsequent objects.

39. The method of any of clauses 32 to 37, wherein said step of determining the flexible measurement scheme is individually performed for each of said subsequent objects.

40. The method of clause 30, wherein the characteristic data comprises a model describing a parameter of the one or more objects or the regions of the object related to the measurement data and said measurement data comprises a first set of measurements and a subsequent set of measurements; the method comprising:

fitting the model to the first set of measurements to obtain a fitted model;
evaluating a model performance of the fitted model using the subsequent set of measurements; and
determining the flexible measurement scheme based on the evaluation of the fitted model performance.

41. The method of clause 40, wherein the first set of measurements relate to a first object of said one or more objects or a first region of said region of the object.

42. The method of clause 40 or 41, wherein said evaluating the model performance comprises sequential steps of:
obtaining a subsequent measurement value relating to an unmeasured measurement location of the subsequent set of measurements;
comparing said subsequent measurement to corresponding respective predicted measurement value predicted using the fitted model.

43. The method of clause 42, wherein said sequential steps are performed until the evaluation step determines that a certain number of the subsequent measurement values are within a tolerance margin.

44. The method of clause 40 or 41, wherein said method comprises determining a value describing a goodness of fit of the fitted model and said evaluating the model performance comprises sequential steps of:
obtaining a subsequent measurement value by measuring an unmeasured measurement location of the subsequent set of measurements;
repeating said fitting step;
determining a revised value describing the goodness of fit; and
evaluating whether the goodness of fit has improved.

45. The method of clause 44, wherein said sequential steps are performed until the evaluation step determines that said goodness of fit is within a tolerance margin.

46. The method of any of clauses 42 to 45, wherein said evaluating the model performance comprises determining an uncertainty metric describing a level of uncertainty associated with unmeasured locations; and performing said sequential steps for said subsequent measurement values until the uncertainty metric meets an uncertainty criterion.

47. The method of clause 46, comprising determining a next unmeasured measurement location for measurement in the first sequential step by selecting the unmeasured measurement location determined to have the highest uncertainty in the fitted model; or unmeasured measurement location having the highest chance of comprising a minimum/maximum value in the fitted model.

48. The method of any of clauses 40 to 47, comprising:
adapting the model when the model performance of the model is below a threshold;

evaluating the model performance of the adapted model;
comparing the model performance of the adapted model and the model performance of the model;
updating the model by the adapted model if the model performance of the adapted model is better than the model performance of the model.

49. The method of clause 48, wherein the updating of the model is based on one or both of: knowledge of known and/or expected behavior; and
genetic programming software operable to select a best model composed by a finite set of given functions.

50. The method of clause 30, wherein said characteristic data comprises an expected pattern or shape; and said method comprises:
obtaining measurement data relating to measurements at one or more of said measurement locations of the one or more objects;
determining a location of the pattern or shape where a maximum or minimum of the pattern or shape is located; and
obtaining a further measurement data relating to a measurement at the location.

51. The method of any of clauses 30 to 50, wherein said objects or regions of an object each comprise a substrate for patterning in a lithographic process.

52. The method of clause 50, wherein said objects or regions of an object each comprise an aperture of an immersion hood for a lithographic apparatus.

53. A lithographic apparatus specifically adapted to carry out the steps of the method of any of clauses 19 to 52.

54. An inspection apparatus specifically adapted to carry out the steps of the method of any of clauses 19 to 52.

55. A computer program comprising computer readable instructions which, when run on suitable computer apparatus, cause the computer apparatus to perform the method of any one of clauses 19 to 52.

56. A computer program product comprising the computer program of clause 55.

57. The method of clause 50, wherein said objects or regions of an object each comprise a component of a lithographic apparatus.

Although specific reference may be made in this text to the use of lithographic apparatus in the manufacture of ICs, it should be understood that the lithographic apparatus described herein may have other applications, such as the processing of substrates in the manufacture of integrated optical systems, guidance and detection patterns for magnetic domain memories, flat-panel displays, liquid-crystal displays (LCDs), thin film magnetic heads, etc. The skilled artisan will appreciate that, in the context of such alternative applications, any use of the terms "wafer" or "field"/"die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g. having a wavelength of or about 365, 248, 193, 157 or 126 nm) and extreme ultra-violet (EUV) radiation (e.g. having a wavelength in the range of 5-20 nm), as well as particle beams, such as ion beams or electron beams.

The term "lens", where the context allows, may refer to any one or combination of various types of optical components, including refractive, reflective, magnetic, electromagnetic and electrostatic optical components.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below. In addition, it should be appreciated that structural features or method steps shown or described in any one embodiment herein can be used in other embodiments as well.

The invention claimed is:

1. A method comprising:
obtaining measurement data associated with a set of locations;
analyzing the measurement data to determine statistically different groups of the locations; and
configuring, by a hardware computer system, a sample scheme generation algorithm based on the statistically different groups.

2. The method of claim 1, wherein the locations in a group together define one or more regions within a field, the field being repeated across one or more substrates.

3. The method of claim 1, wherein:
the locations in a group together define one or more regions spanning a plurality of fields across one or more substrates, the plurality of fields having different respective sub-sampling in a sampling scheme generated by the sample scheme generation algorithm; and
the analyzing the measurement data comprises stacking the measurement data across the spanned plurality of fields using their different respective sub-sampling to determine the statistically different groups of the locations.

4. The method of claim 1, wherein the sample scheme generation algorithm comprises a genetic algorithm.

5. The method of claim 4, wherein the configuring comprises configuring a crossover operator to swap sampling information between the determined statistically different groups.

6. The method of claim 4, wherein the configuring comprises configuring a mutation operator to mutate sampling information in a selected determined statistically different group.

7. The method of claim 4, wherein the sample scheme generation algorithm comprises a multi-objective genetic algorithm and the method further comprises:
obtaining a constraint associated with a sample scheme across one or more substrates; and
using the constraint as an input to the sample scheme generation algorithm.

8. The method of claim 4, wherein the sample scheme generation algorithm comprises a multi-objective genetic algorithm and the method further comprises:
obtaining a plurality of key performance indicators associated with a sample scheme across one or more substrates; and
using the key performance indicators in a fitness function in the sample scheme generation algorithm.

9. The method of claim 8, wherein the fitness function comprises a comparison between the key performance indicators calculated for the measurement data of the set of locations and the key performance indicators calculated for a reduced sample scheme individual.

10. The method of claim 1, wherein the set of locations is defined across one or more substrates.

11. The method of claim 1, wherein the set of locations is defined across one or more fields.

12. The method of claim 11, wherein the measurement data comprises values of a parameter measured across a field by a sensor within an optical plane.

13. The method of claim 12, wherein the parameter is one of: an aberration level, a dose, a focus level or a detected position of a mark.

14. A computer program product comprising a non-transitory computer-readable medium having computer instructions therein, the instructions, when executed by a computer system, configured to cause the computer system to at least:
obtain measurement data associated with a set of locations;
analyze the measurement data to determine statistically different groups of the locations; and
configure a sample scheme generation algorithm based on the statistically different groups.

15. A method comprising:
obtaining measurement data associated with one or more substrates;
obtaining (i) a constraint associated with a sample scheme across one or more substrates, or (ii) a plurality of key performance indicators associated with a sample scheme across one or more substrates, or (iii) both (i) and (ii); and
using, by a hardware computer system, the constraint, or the plurality of key performance indicators, or both the constraint and the plurality of key performance indicators, in a sample scheme generation algorithm configured to determine samples to be measured, the sample scheme generation algorithm comprising a multi-objective genetic algorithm configured to process the measurement data.

16. The method of claim 15, further comprising:
obtaining measurement data associated with a set of locations across one or more substrates;
analyzing the measurement data; and
optimizing a sample scheme based on the analysis,
wherein the locations define one or more regions spanning a plurality of fields across one or more substrates, the plurality of fields having different respective sub-sampling in the sampling scheme;
wherein the constraint is based on the analysis; and
wherein the analyzing the measurement data comprises stacking the measurement data across the spanned plurality of fields using their different respective sub-sampling.

17. The method of claim 16, wherein the optimizing the sample scheme comprises configuring a crossover operator of a sample scheme generation algorithm to swap sampling information between the fields.

18. The method of claim 16, wherein the optimizing the sample scheme comprises configuring a mutation operator of a sample scheme generation algorithm to mutate sampling information in a selected field.

19. A method comprising:
obtaining measurement data associated with a set of locations across one or more substrates;
analyzing the measurement data; and
optimizing, by a hardware computer system, a sample scheme based on the analysis,
wherein the locations define one or more regions spanning a plurality of fields across one or more substrates, the plurality of fields having different respective sub-sampling in the sampling scheme, and
wherein the analyzing the measurement data comprises stacking the measurement data across the spanned plurality of fields using their different respective sub-sampling.

20. A computer program product comprising a non-transitory computer-readable medium having computer instructions therein, the instructions, when executed by a computer system, configured to cause the computer system to at least:
obtain measurement data associated with a set of locations across one or more substrates;
analyze the measurement data; and
optimize a sample scheme based on the analysis,
wherein the locations define one or more regions spanning a plurality of fields across one or more substrates, the plurality of fields having different respective sub-sampling in the sampling scheme, and
wherein the analysis of the measurement data comprises stacking of the measurement data across the spanned plurality of fields using their different respective sub-sampling.

21. A computer program product comprising a non-transitory computer-readable medium having computer instructions therein, the instructions, when executed by a computer system, configured to cause the computer system to at least:
obtain measurement data associated with one or more substrates;
obtain aa constraint associated with a sample scheme across one or more substrates, or (ii) a plurality of key performance indicators associated with a sample scheme across one or more substrates, or (iii) both (i) and (ii); and
use the constraint and/or the plurality of key performance indicators in a sample scheme generation algorithm comprising a multi-objective genetic algorithm configured to process the measurement data.

* * * * *